US006240444B1

(12) United States Patent
Fin et al.

(10) Patent No.: US 6,240,444 B1
(45) Date of Patent: *May 29, 2001

(54) INTERNET WEB PAGE SHARING

(75) Inventors: Tong-Haing Fin, Harrison; Tetsunosuke Fujisaki, Armon, both of NY (US); Makoto Kobayashi; Masahide Shinozaki, both of Toyko (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/722,287

(22) Filed: Sep. 27, 1996

(51) Int. Cl.$^7$ .............................. G06F 15/16; G06F 17/00
(52) U.S. Cl. ........................................... 709/205; 709/320
(58) Field of Search ...................... 395/200.38, 200.39, 395/200.4, 200.41, 200.34, 200.35, 200.48; 709/204, 205, 206, 207, 320

(56) References Cited

U.S. PATENT DOCUMENTS

| 5,008,853 | | 4/1991 | Bly et al. ............................... 364/900 |
| 5,206,934 | * | 4/1993 | Naef, III ............................... 709/204 |
| 5,220,657 | | 6/1993 | Bly et al. ............................... 395/425 |
| 5,293,619 | | 3/1994 | Dean ..................................... 395/650 |
| 5,315,711 | * | 5/1994 | Barone et al. ........................ 395/275 |
| 5,339,389 | | 8/1994 | Bates et al. ........................... 395/153 |
| 5,363,507 | | 11/1994 | Nakayama et al. .................. 395/800 |
| 5,371,852 | | 12/1994 | Attanasio et al. .................... 395/200 |
| 5,379,374 | | 1/1995 | Ishizaki et al. ....................... 395/155 |
| 5,442,788 | | 8/1995 | Bier ...................................... 395/650 |
| 5,446,842 | | 8/1995 | Schaeffer et al. ................ 395/200.01 |
| 5,537,548 | * | 7/1996 | Fin et al. ......................... 395/200.04 |
| 5,721,842 | * | 2/1998 | Beasley et al. ....................... 395/311 |
| 5,862,330 | * | 1/1999 | Anupam et al. ...................... 709/204 |

FOREIGN PATENT DOCUMENTS 0 527 590 A2    2/1993 (EP) .
9508793         3/1995 (WO) ................................ G06F/3/00

OTHER PUBLICATIONS

Peters, R. & Neuss, C., "Crystal Web—A Distributed Authoring Enviroment for the World–Wide Web," *Computer Networks and ISDN Systems*, vol. 27, 1995, pp. 861–870.

Haake, J. M. & Wilson, B., "Supporting Collaborative Writing of Hyperdocuments in SEPIA," *Proceedings of the Conference on Computer Supportive Cooperative Work*, Oct. 31, 1992, pp. 138–146.

Watanabe, K., Sakata, S., Maeno, K., Fukuoka, H. & Ohmori, T., "Multimedia Desktop Conferencing System: Mermaid," *NEC Research and Development*, vol. 32, No. 1, Jan. 1, 1991, pp. 158–167.

Mosaic + XTV = CoReview; Maly et al.; Computer Science Dept., Old Dominion University, Norfolk, Virginia 23529.

On the Partitioning of Function in Distributed Collaboration Systems; SIGOIS Bulletin, Dec. 1944/vol. 15, No. 2.

Microsoft Visual C++ "Professional Subscription"—Pages Marked as 1–14.

Netscape's DDE Implementation; http://home.netscape.com/newsref/std/ddeapi.html—16 pages.

* cited by examiner

*Primary Examiner*—Dung C. Dinh
(74) *Attorney, Agent, or Firm*—McGuireWoods, LLP; Louis J. Percello, Esq.

(57) ABSTRACT

The web sharing manager of a receiving sharing client receives duplicated events (e.g. browser requests) and messages from the web sharing manager of a source sharing client that causes the browser of the receiving sharing client to execute the duplicate event/message so that the browsers of the source and receiving sharing client computer system(s) process the same events/messages. Because events/messages, that include control and information locations (addresses), are shared between the source and receiving and sharing client(s), the same web page is simultaneously displayed and controlled, i.e. shared, on all of the sharing client(s).

24 Claims, 13 Drawing Sheets

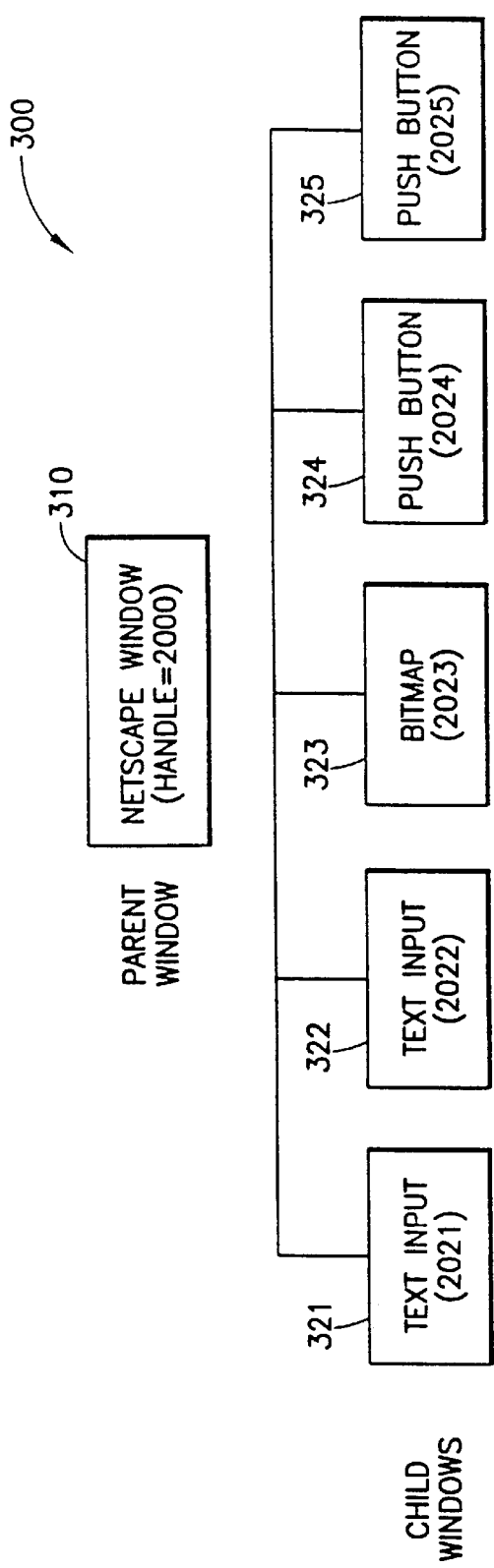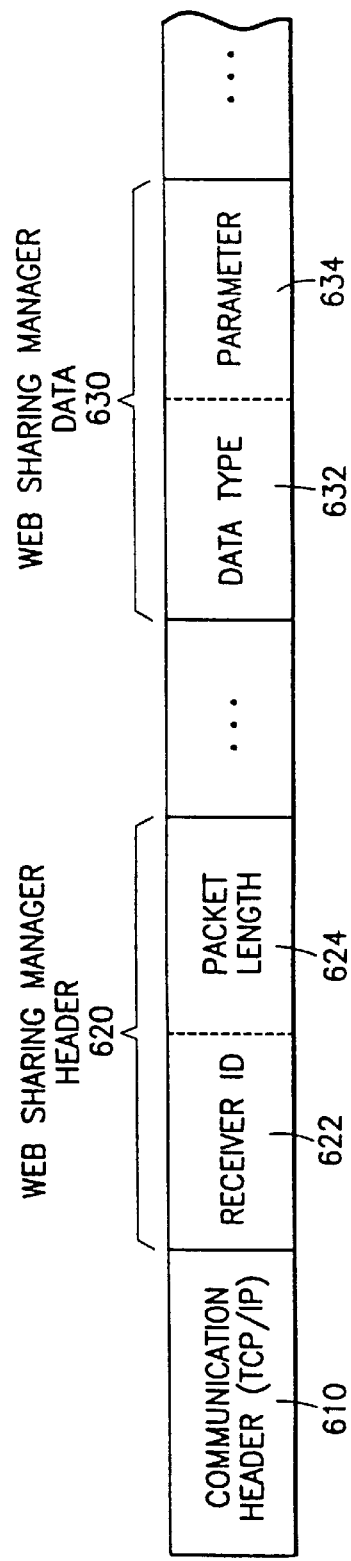

| ORDERING NUMBER | WINDOW HANDLE | WINDOW TYPE |
|---|---|---|
| 0 | 2000 | WEB BROWSER WINDOW |
| 1 | 2021 | TEXT INPUT |
| 2 | 2022 | TEXT INPUT |
| 3 | 2023 | BITMAP |
| 4 | 2024 | PUSH BUTTON |
| 5 | 2025 | PUSH BUTTON |
| ... | ... | ... |

FIG. 5A

| ORDERING NUMBER | WINDOW HANDLE | WINDOW TYPE |
|---|---|---|
| 0 | 5000 | WEB BROWSER WINDOW |
| 1 | 5021 | TEXT INPUT |
| 2 | 5022 | TEXT INPUT |
| 3 | 5023 | BITMAP |
| 4 | 5024 | PUSH BUTTON |
| 5 | 5025 | PUSH BUTTON |
| ... | ... | ... |

FIG. 5B

INTERNET WEB PAGE SHARING

FIELD OF THE INVENTION

This invention relates to the field of network data sharing. More specifically, the invention relates to multiple users sharing the same HTML page on the internet.

BACKGROUND OF THE INVENTION

The Internet comprise multiple interconnected computer networks so that any computer on a given network can communicate with one or more computers on any other given network. A gateway computer is a computer which interconnects two networks and passes data from one network to the other(s).

All the computers on the Internet communicate through certain communication protocols, i.e., Internet Protocol (IP). Most applications use Transmission Control Protocol (TCP) along with the Internet Protocol. Therefore the Internet is also referred as a TCP/IP network. Any computer connected to Internet is identified by a unique Internet address.

The Internet uses a well known packet-switch technology to route information. On the Internet, the data is transferred through packets (also called IP packets) with an address. The speed and reliability of transmission of the IP packets rely on the data traffic and routing. For an example of internetworking communications, see U.S. Pat. No. 5,371,852 to Attanasio et al. entitled "Method and Apparatus for Making a Cluster of Computers Appear as a Single Host on a Network" issued Dec. 6, 1994 which is herein incorporated by reference in its entirety.

Some common Internet applications include Electronic Mail, FTP, Telnet and Network news among others. Internet communication protocols and applications are well known.

The World Wide Web (i.e., WWW or Web) is an information service system which is based on the Internet. The WWW uses Hypertext and client/server technology.

Hypertext is a method of organizing and presenting information such that any data object in a hypertext file can have links to other hypertext files or data objects. For example, while viewing a hypertext page, a user can select a word which has links. This may bring the user to another hypertext file which contains more text and picture explaining this word. (The new file may also have more links to other hypertext files and so forth.)

Currently the hypertext file is organized using a HyperText Markup Language (HTML). A hypertext data object can be almost any information medium such as text, image, sound, movie or even a piece of an executable computer program. Any hypertext file on the Web is uniquely identified by its Universal Resource Locator (URL).

The Web client or client (commonly a computer executing a program called a browser) is essentially a hypertext reader which communicates with a Web server through certain data transfer protocols, such as a HyperText Transfer Protocol (HTTP). The client can request a hypertext file with its URL and display the file on a graphical user interface (GUI). This display is called a web page. The client can also pass certain data back to the server and can invoke the Common Gateway Interface (CGI) programs on the server computer to conduct certain tasks. Browsers are commonly known. One popular Browser is Netscape Navigator. "Netscape Navigator" is a trademark of the Netscape Communications Corporation.

Using the world wide connections of the Internet, the WWW allows a user, being anywhere on the Internet, to post any hypertext file on the WWW and fetch any hypertext file from all over the world as conveniently as using a local hard disk. This gives the user a tremendous power to acquire information and also turns the Internet into a hypermedia global database, i.e., the information superhighway.

The Internet and the WWW have been growing explosively over the past few years. Businesses have also seen the great potential of using the Internet and WWW as the new generation of world-wide communication infrastructure to approach a massive consumer market.

Even though the Web technology gives a user great ability to access/send all kinds of information anywhere in the world, currently users basically have to "travel alone," i.e., users can not present the same information on their web page as other users who are concurrently browsing.

STATEMENT OF PROBLEMS WITH THE PRIOR ART

Individual users can run a browser to view web pages. The web pages are in the form on an HTML format. However, the browser used by each individual can not control other browsers in terms of what page another browser is seeing.

Currently, if a first person wants to share a web page with a second user, i.e. "collaborate," the first and second users have to use another communication means, e.g. a telephone, to coordinate their collaboration. For example, they must coordinate the sharing of the page by sharing the address of the page, selecting entries of the page, communicating movement on the page, communicating movements to an from other locations, etc. This coordination requires that the first and second user exchange a great deal of information often with one another over the other communication means in order to coordinate the browsing.

The prior art does not permit any automatic communication and/or control directly between two or more browsers used by two or more respective users on the internet. Any collaboration, e.g., page sharing, done by the prior art, requires the users to communicate through a communication line other than through the browser. Collaboration requires the facility and the expense of a second communication means. The prior art collaborations often require repeated, and error prone, exchanges of information over the second communication means.

Further, the users can not have "simultaneous collaborations" on a given page. For example, the first user can move to a different location on the page or more to a different page without the second user knowing it. Unless the first and second users communicate over a separate communication link, the first user will not be aware of what the second user is seeing/doing on their respective pages, and visa versa. For example, a bank customer looking at a bank HTML home page can not ask a question and/or receive an answer of (from) a bank clerk or agent unless the communication between the customer and the bank agent is done by another communication method, e.g. phone. The agent (customer) does not have control over what page the customer (agent) sees.

The prior art does not permit users to collaborate and/or share information on a common web page simultaneously. That is, multiple users do not automatically see the same page (and changes to the page) at the same time. Multiple users, also do not share control of the information on the web. For example, they do not see changes at the same time and/or do not see transfers to other pages at the same time.

OBJECTS OF THE INVENTION

An object of this invention is a system and method that allows two or more users of the internet to simultaneously collaborate (view, move on, and/or change) a HTML page.

An object of this invention is a system and method that allows one or more browsers used on the internet to simultaneously control one or more other browsers used on the internet.

An object of this invention is a system and method that allows one or more standard browsers used on the internet to simultaneously control one or more other standard browsers used on the internet without modifying the browsers or computer operating systems.

SUMMARY OF THE INVENTION

One or more client computer systems have a memory, one or more central processing units (CPU), an interface to a network, and a browser. A network, e.g. the Internet, provides a communication link between the one or more first (e.g. source) clients and one or more second (e.g. receiving) client computer systems using one or more Web servers. The second client(s) also has (have) a memory, a CPU(s), a network interface and a browser. In the first and second clients, the browser is capable of accessing one or more HTML pages from one or more of the Web servers by sending one or more browser requests to any one of the Web servers.

The sharing clients are one or more first and one or more second client computer systems that are collaborating with one another through their respective web sharing manager. The web sharing manager of a receiving sharing client receives the duplicated events (e.g. browser requests) and messages from the web sharing manager of a source sharing client and that causes the browser of the receiving sharing client to execute the duplicate event/messages, that include control and information locations (addresses), are shared between the source and receiving sharing client(s), the same web page is simultaneously displayed and controlled on all of the sharing client(s). Examples of events that are shared between clients include the following browser requests: location of information on the WWW, gateway connections to additional networks (including telephone networks), etc. Examples of messages include: input/output controls like mouse controls, pen controls, and keyboard input; operating system messages, and application messages.

One preferred embodiment of the invention can be added to a computer system without changing the browser or the operating system of the computer, as long as the browser has a "registration function" and the operating system has a "hooking function". The registration function causes certain events, for example CCI events, to be routed to a redirector while the hooking function permits a message redirector access to a message queue of the operating system. The registration function and hooking function work with one or more redirectors in the sharing clients to route duplicate browser events and messages among the sharing clients so that the same web page appears on each of the sharing clients.

BRIEF DESCRIPTION OF THE DRAWINGS

FIG. 3 shows a hierarchy of windows (parent-child relationship) for the Web sample document of FIG. 2.

FIG. 5, comprising FIGS. 5A and 5B, are example block diagrams of a mapping table data structure.

FIG. 6 is a block diagram of communication packet.

DETAILED DESCRIPTION OF THE INVENTION

Figure 1:
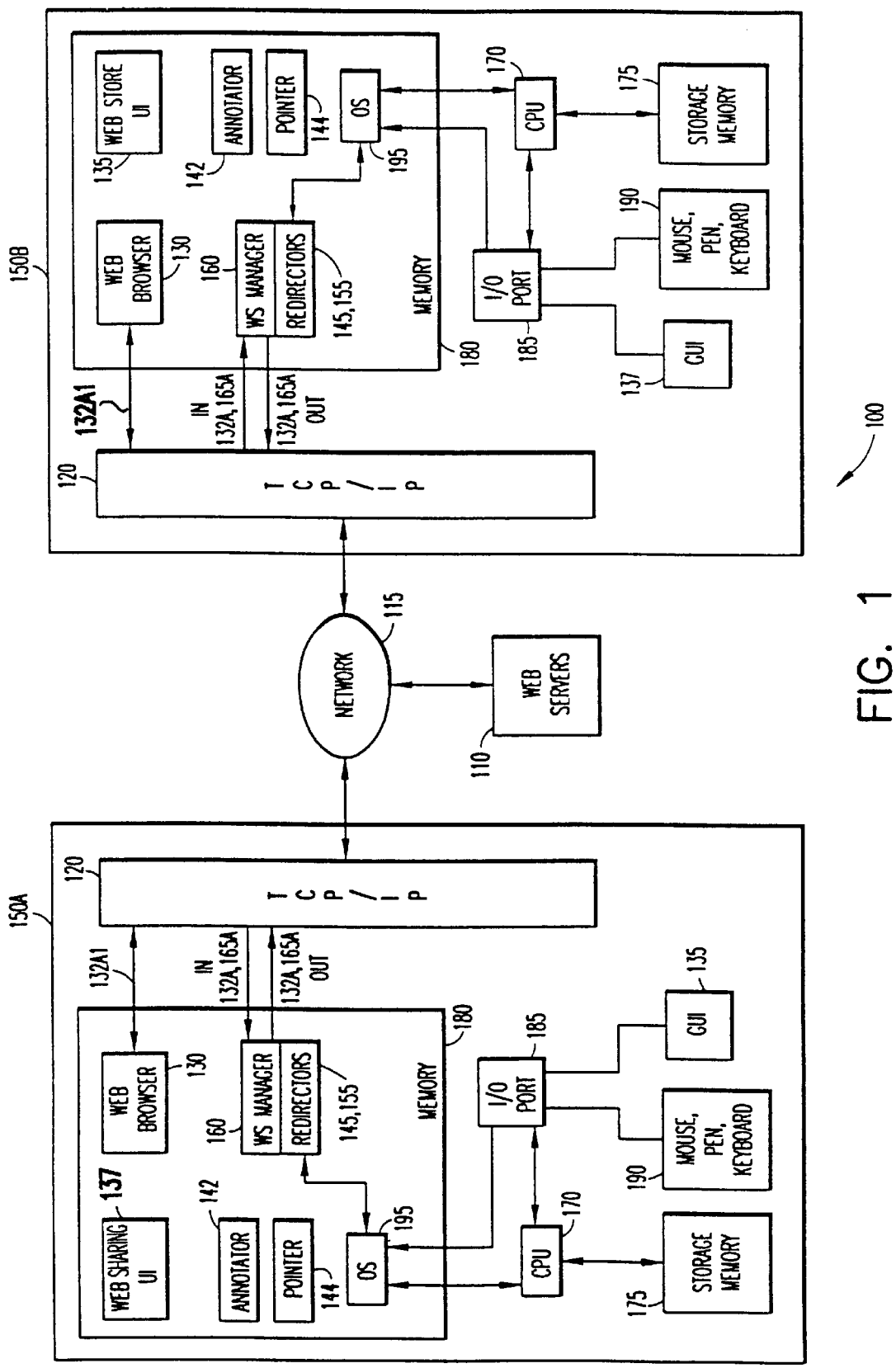
FIG. 1 is a block diagram of the present invention used in a client/server network architecture.

FIG. 1 is a block diagram of one preferred embodiment of the present system 100. The system 100 is a computer network 115 with one or more servers 110 and one or more client computers 150 (e.g., 150A and 150B). In a preferred embodiment, the network uses a TCP/IP protocol 120 for communication among the various clients 150 and servers 110. The protocol 120 is hardware that connects clients 150 to the network 115 and usually also includes software resident on the client main memory 180. The protocol 120 hardware and software (also referred to as the network interface) are well known. One preferred embodiment of the network 115 is the internet and the WWW.

Each of the clients 150 (e.g. 150A and 150B) is a computer with a central processing unit (CPU 170), storage memory(ies) 175, main memory(ies) 180, and input/output (I/O) interface(s) 185. The I/O interface 185 permit input devices 190, like a mouse, keyboard, pen overlay, virtual reality inputs, speech recognition system to be processed by the CPU 170 and operating system 195. Other I/O interfaces 185 operate graphical user interfaces (GUI) 135 on the client. Equivalent client computers 150 are well known. One preferred example of a client computer is any IBM personal computer, e.g. an Aptiva (a trademark of the IBM Corporation). Speech recognition systems like IBM's Voice-Type 3.0 dictation system are also well known. (Voice Type is also a trademark of the IBM Corporation). Examples of virtual reality inputs and systems are given in International Patent Application Number WO 95/08793 assigned to Virtual Universal Corporation (U.S. patent application Ser. No. 08/125,950) with a priority date of Sep. 22, 1993 which is herein incorporated by reference in its entirety.

Each of the clients 150 (e.g., 150A and 150B) participating in this web page sharing invention also have processes executed by the client. See FIG. 1A for more detail of FIG. 1. Typically, these processes reside on the main memory 180 of the respective client (150A and 150B) and include a known Web Browser 130, a known Web Sharing User Interface 137, an optional known Annotation device (Annotator) 142, and an optional known Remote Pointer 144. A novel Redirector (in one preferred embodiment, a Common Client Interface Redirector) 145, a novel Message Redirector 155, and a novel Web Sharing Manager 160 are also provided as processes running on each client 150.

In the following discussion, one or more clients originating an event (e.g. a request) and/or message in the web page sharing collaboration is called a source of sending sharing client (or machine) or source client/machine and is designated 150A. Reciprocally, one or more sharing clients receiving an event and/or message is called a receiving sharing client (or machine) or receiving client/machine and is designated as 150B. Of course, these sharing clients can and do interchange roles. Components of the source 150A and receiving 150B machines have their numeric designators appended with "A" or "B", respectively.

Figure 1A:
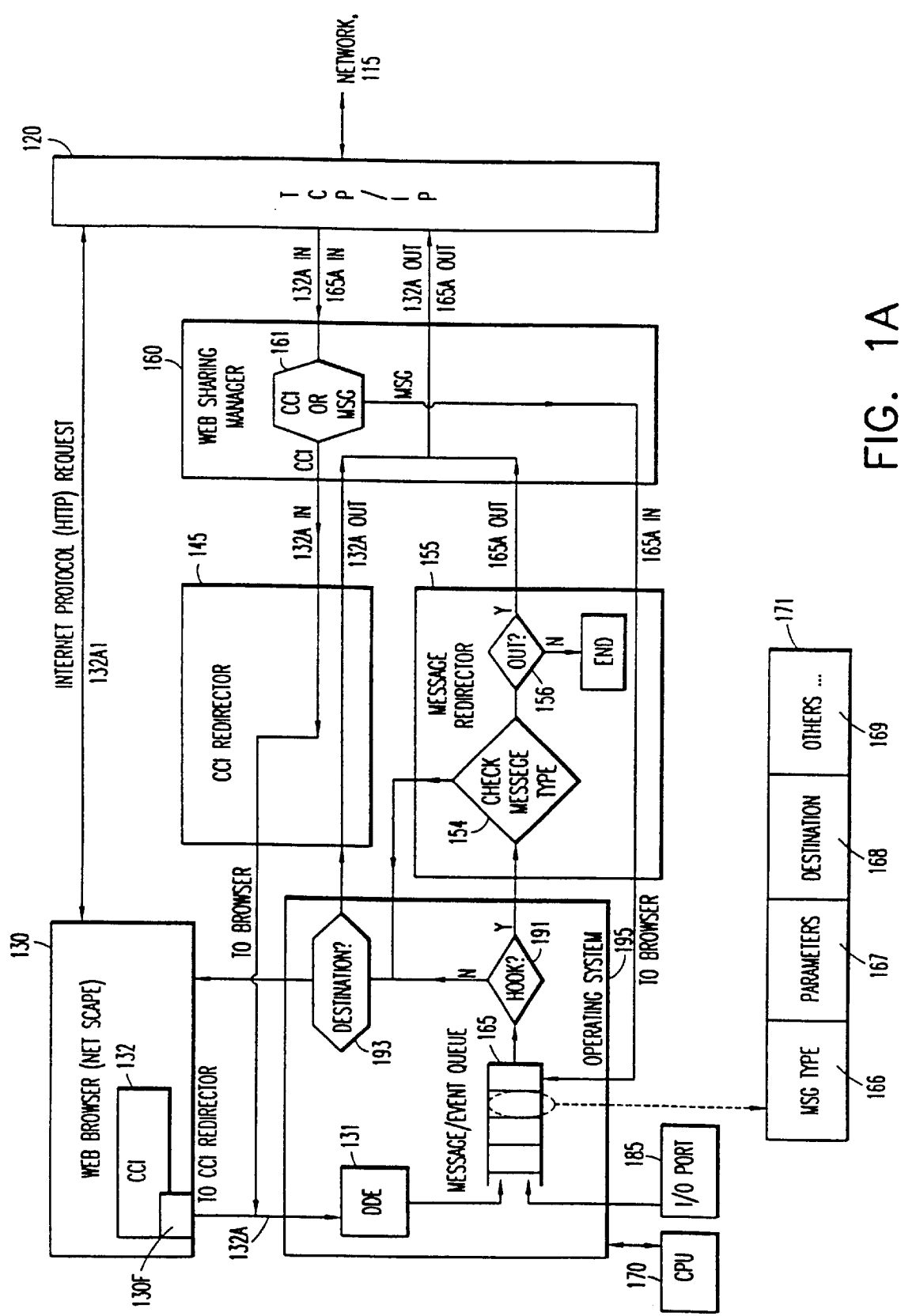
FIG. 1A is a block diagram of a detail of the system in FIG. 1 that also shows the flow of events (e.g., browser requests) and messages, i.e., information and controls, in the invention.

For clarity in FIG. 1, some processes are omitted. However, more detail is shown in FIG. 1A. All clients 150 have the Web Browser 130, Web Sharing User Interface 137, a redirector (e.g., a Common Client Interface (CCI) redirector 145), message redirector 155, and web sharing manager 160. Clients 150 also typically have input/output (I/O) ports 185 and optional drivers like the annotation (annotator) 142 and remote pointer 144 drivers.

In a preferred embodiments, the web sharing manager 160 and redirectors (145, 155) are processes that are independent of the browser 130 and operating system 195. However, the redirector processes (145, 155) connect to the browser 130 through a registration function 130F and to the operating system 195 through a hook 191 so that they can access event information from the browser and access and provide message and event information stored in a memory 165 used by the operating system 195. In a preferred embodiment, the memory 165 used by the operating system to store and access messages and request/event information (in a message form) is a message/event queue (or queue) 165. The redirectors (145, 155) make sure that the request/events and messages are routed to the correct place in both the source and receiving sharing clients so that the same web page appears on all sharing clients.

The structure of the queue 165 is well known and defined by the operating system. Typically, the queue entries 171 (messages and events/requests in "DDE" message form) in the queue 165 have the structure including: a message type 166, parameters 167 associated with the message, a destination 168 which specifies the receiver of the message, and other information 169.

By loading the web sharing manager 160 and the redirectors (145, 155) into the memory 180 of the sharing client 150, any client with a standard browser 130 (having a registration function 130F) and a standard operating system 195 with a hook 191 to the message/event queue 165 can be converted to a sharing client 150 that can collaborate with other sharing client(s) 150 without modification to the browser 130 or operating system 195.

In a preferred embodiment, the computer system 150 uses the redirector (specifically a CCI redirector) 145 to send duplicate (CCI) events 132AOut, generated by the browser 130 of the source client 150A, to one or more receiving clients 150B. The (CCI) redirector 145 of the receiving clients 150B causes received (CCI) events 132AIn to be processed appropriately and routed to the browser 130 in the receiving client 132AIn to be processed appropriately and routed to the browser 130 in the receiving client 150B for execution. (Note that in this disclosure, event and CCI event and redirector 145 and CCI redirector 145 will be used interchangably without loss of generality).

The sharing client computer system 150 also uses the message redirector 155 to duplicate messages (like keyboard and mouse inputs 185) produced by the source client 150A and sends these duplicate messages 165AOut to the receiving client(s) 150B. The message redirector 155 is used by the receiving client 150B to mark or tag (see below) received messages 165AIn and works with the operating system 195 to process these received messages 165AIn.

The Web Browser 130 can be any commercially available network browser that has a registration function, e.g., Netscape Navigator 130. The Web Browser 130 communicates to the network 115 and servers 110 using well known internet protocols (e.g. http, ftp) on top of a TCP/IP protocol.

The Web Sharing User Interface 137 provides the look and feel for users of this package to establish the connection, to invoke tools (for example, remote pointer 144, annotation 142), to share or unshare the Web browser's document, and to show the status of other users. Since the user interface component 137 used in this system 100 is a simple and known function that can be found on most desktop conferencing systems, it will not be described further.

The annotation or annotator 142 provides handwriting (or pen based) capability to write comments or highlight some areas of a web document and the remote pointer 144 is used to point to or move around the objects on a shared document. A pen input device 190, if it is available, may be used for annotation or pointing (alternatively, a mouse 190 can be used). This capability of annotation 142 and the remote pointer 144 is well known in the desktop video conferencing products (see for example, the IBM Person to Person product).

Refer again to FIG. 1A, a block diagram of a detail of the system in FIG. 1, that shows the flow of information and controls (events and messages) among components in the invention.

A preferred embodiment of the invention includes two software components: the CCI redirector 145 and the message redirector 155. The CCI redirector 145 monitors and routes the CCI events 132A that the browser 130 sends and/or requests and the CCI events 132AIn that are received from the network 115. The message redirector 155 captures and routes the input data messages from input devices (e.g., keyboard, mouse, pen messages) 190 and other origins. In alternative embodiments one "redirector" could perform the functions of both the CCI redirector 145 and the message redirector 155. In other alternative embodiments, the redirecting could be performed by the browser and/or the web sharing manager that are designed specifically to include these functions.

In a preferred embodiment, the invention uses a "registration" feature 130F or known browsers 130. Many browsers call this registration feature a Common Client Interface (CCI) (132, 130F). The CCI 132 of some Web browsers 130, for example the NetScape Navigator, provide features for external programs to control and extend the functionalities of the browser 130 through this cross-platform interface (CCI 132). The CCI 132 is specified as a set of interfaces which can be used to communicated either to or from Web browsers 130. Using this CCI 132, the user defines the CCI events 132A that the browser is to pass to an external process, here the CCI redirector 145. Therefore, every time that the browser 130 generates a "registered" CCI event, the browser not only sends the CCI event 132A1 through the TCP/IP protocol 120 to the network 115 but also sends a duplicate CCI event 132A to the operating system 195. In a preferred embodiment the operating system 195 applies a Dynamic Data Exchange (DDE) protocol 131 to the duplicate CCI event 132A before the operating system 195 stores the CCI event 132A, preferably in the queue 165. The DDE protocol makes the CCI event/request 132A appear as a DDE message in the queue 165. The detail specification of CCI 132 for the NetScape Navigator is described in http://home/netscape.com/newsref/std/ddeapi.html for the Netscape browser 130.

The Netscape Navigator in a Windows platform uses DDE 131 to implement CCI 132. DDE 131 is a known message based inter-process communication protocol defined in the Windows platform and used by the browser 130 and for this invention by the CCI 132.

For example, when a user/client 150 opens a new Web document by explicitly specifying a URL of the document or by clicking a hyperlink to a URL document, the browser 130 sends an event (request) 132A1 requesting a page from the Web server 110 through the TCP/IP interface 120. Since the CCI redirector is pre-registered (130F, 132) for monitoring CCI event 132A called OpenURL to the operating system 195 that applies the DDE protocol 131 to the event 132A and places it one the queue as a DDE message. The CCI event 132A is eventually routed (see discussion and FIG. 14 below) to the CCI redirector 145 which causes the CCI event 132A to be routed through the web sharing manager 160 (as a "packet"—see FIG. 6 below) and through the network interface 120 over the network 115 to the shared receiving clients 150B.

As another example, when the window of the Web browser 130 is changed (e.g. resized or maximized by a user 150), a CCI event 132A called WindowChange is sent by the browser 130 to the CCI redirector.

In DDE protocol terminology, Open URL or WindowChange CCI events 132A are set in a DDE topic name and the URL of the document or the new size of the browser's window is set in a DDE item. In the entry 171 of this DDE message, the message type 166 will be set to "DDE message", the parameter field 167 will contain CCI event 132A, and the destination field 168 will be the CCI redirector.

The message redirector 155 routes all messages incoming 165AIn from the network 115 to the queue 165 and monitors all queue entries (events/requests and messages) on the queue 165 that are processed by the operating system 195. The message redirector 155 monitors the queue 165 by "hooking" the queue. The message redirector 155 processes certain queue entries, e.g. messages and events, in the queue 165 in which the message redirector 155 has an "interest." See below.

This invention uses a known feature called hooking 191 provided by the operating system 195 to catch all queue entries 171 in the queue 165. If a hook is installed with the operating system 195, all retrieved queue entries 171 from the queue 165 are passed to the hook 191. The hook 191 permits the message redirector 155 to check 156 the message type 166 to determine whether the message redirector "has an interest", i.e., will process the queue entry 171. If the message redirector 155 has no interest, control is passed back to the operating system 195 so that the queue entry 171 can be further processed by the operating system 191. However, if the message redirector 155 has an interest 156, the message redirector 155 processes the queue entry before the operating system is allowed to deliver the queue entry 171 to its destination, e.g. an application. After the message redirector 155 has completed its processing, control is returned to the operating system 195 to further process the queue entry 171. The message redirector 155 has an interest in those messages (not including DDE messages handled by the CCI redirector) necessary to recreate the web page at the source sharing client 150A on the receiving sharing client(s) 150B.

For example, the CCI event 132A is put into the queue 165 by the operating system 195 as a DDE type 166 message. When the operating system 195 is requested to retrieve a queue entry (the DDE message/CCI event 132A), the operating system 195 checks if there is any hook 191 before delivering this CCI event 132A to the destination application. Since the message redirector 155 hooks 191 the queue, the operating system 195 passes control of the CCI event 132A to the message redirector 155. The message redirector 155 checks the message type field 166 to determine 156 if the message redirector 155 needs to process the queue entry 171. Since, in this embodiment, the message redirector 155 ignores all CCI events (DDE message types 166), the processing of the CCI event 132A by message redirector ends and control passes back to the operating system 195.

The operating system 195 then uses the destination field 168 of the DDE message to deliver 193 the DDE message. If the CCI event originated in the browser 130, the browser placed the CCI redirector 145 as the destination in the destination field 168. However, if the CCI event 132AIn originated from an external source sharing client and was received from the network, the CCI redirector 145 placed the browser 130 (associated with its client 150A) as the destination in the destination field 168. In either case, these CCI events are made into DDE messages by the DDE 131 and placed on the queue 165.

As the entries 171 in the queue 165 are then processed (see hook 191 below) the operating system determined how to route the CCI events 193. In the case of CCI event that was received from a source sharing client 150A, the destination field 168 indicates that the message will be directed 193 to the browser 130. However, the CCI events that are generated at the source sharing client 150A have a destination 168 of the CCI redirector 145 and are directed 193 there 145. The CCI redirector requests the Web Sharing Manager 160 to send this CCI event 132AOut across the network 115 to the receiving sharing client 150B. The receiving sharing client 150B will use this CCI event (now a 132AIn) to duplicate the CCI event (e.g. request) on the receiving sharing client 150B so that the web pages on all of the shared clients are kept the same.

A "hook" 191 is a well known operating system 191 defined function that allows external processes to intercept queue entries 171 in the memory, e.g. the queue 165, of the operating system 195. Once an external process invokes the hook, the operating system 195 passes requested information, e.g. one of the queue entries 171, to the external process. Once the external process, e.g. the message redirector 155, completes its function, the external process passes control back to the operating system 195 by some indication like a "return" in the function call. For example, in the Windows 95 (a trademark of the Microsoft Corporation) the "hook" is defined in the "Software Development Kit" (SDK) referenced in Win32 Programmer's References. For the OS2 operating system, it is defined in Presentation Manager Programming References.

Queue entries 171 can originate from several places. As described above, duplicate CCI events 132A originating from the CCI 132 in the browser 130 are placed in the queue 165 after the DDE protocol is applied. Also, received CCI events 132AIn are identified 161 by the web sharing manager 160 and pass through the redirector 145 and DDE 131 to the queue 165. The DDE assigns each of the CCI events (132A and 132AIn) with a message type 166 "DDE message" and a destination 168 as described above.

In addition to events, queue entries 171 include messages. Messages can be generated by the operating system 195 (internal messages) or by origins external to the operating system 195 (external messages). External message include messages from the input devices 190 and the I/O port 185, messages generated by inter-process communications, and messages received from a sharing client 150 connected through the network 115.

The operating system 195 generates internal messages that include: "scrolling", "move a window", 37 resize a window", "minimize a window", and "maximize a window". These messages are defined in the SDK for the operating system 195. The operating system 195 gives these internal messages a "window message" message type 166 and the window handle of the appropriate window as a destination 168.

Messages from input devices 190 include: keyboard messages like "key up", "key down", and "key code" (e.g., and ASCII value); mouse messages like "mouse up", "mouse down", "mouse move", and "mouse double click"; pen messages like "pen up", "pen down", and "pen move"; and annotator messages line "annotator up", "annotator down", and "annotator move." For each of these message, the operating system 195 assigns a queue entry 171 message type 166. For example, if the left mouse button moves up, the message type 166 will be "mouse left button up." Further the destination field 168 will contain the window handle of the window where cursor is located. The parameter field 167 will contain the (X,Y) of the mouse cursor and the other field 169 might contain other information like a time stamp. Populating these queue entry data structures 171 in this way is well known.

Messages are commonly used as the inter-process communication between applications, especially in a message based window system (e.g. Windows 3.1 or OS/2). When an application requests an operating system 195 to send a message to another application, the operating system 195 puts the message into a queue 165 and then delivers the message when the destination application requests the operating system 195 to retrieve a message from the queue 165. This message event/queue 165 is also used to put and deliver other known messages to the applications (e.g. when the window of the application needs to be repainted).

Similar to the inter-process communication between applications, the communication between the input devices 190 and the applications are also through the queue 165. All input data, defined above by example, from input devices 190 (e.g. keyboard, mouse, pen) are transformed into well defined messages by the window operating system 195 and are put into queue 165. To read its input data, each application will request the window system to retrieve the messages from the message event queue 165 as a queue entry 171.

In one preferred embodiment, messages are received by one or more receiving sharing clients 150B from the network 115. These messages are passed through the web sharing manager 160 which determines 161 whether the received signal is a message or an (CCI) event (e.g., request). If the received signal is a message 165AIn, the message is passed through the message redirector 155 and then to the operation system where it is placed on the queue just as any other external message. However, in this case, the message 165AIn is tagged to indicate that it came from the message redirector 155, i.e., the network 115. In a preferred embodiment, the message redirector 155 tags the message by adding a fixed number (e.g. an offset) to the message type field 166 which produces a message type 166 that is understood by the message redirector to identify any message from a remote source sharing client 150A. Note that these messages 165AIn can include any of those messages that are generated by a source sharing client 150A and received over the network 115 either as application messages, input device messages, or as internal operating system messages.

Since the message redirector 155 has hooked 191 the queue 165, the message redirector 155 examines each of the queue entries 171 in the queue 165. However, the message redirector 155 only "has an interest", i.e. only processes, certain of these queue entries 171. In general, the message redirector 155 needs to processes only those queues entries 170 that are required to create the same page on any of the sharing clients 150.

Examples of queue entries 171 that are processed by the message redirector 155 include queue entries with message types 166: "key code" for the key board, "mouse (left or right) button (click or double click)", "mouse move", "scrolling", and "window (get/lost input focus)" messages. These messages are tagged by the message redirector.

Examples of queue entries 171 that typically are not processed by the message redirector 155 include queue entries 171 with message types 166: "key up (down)", "mouse (left or right) button (up or down)", "window (move or resize)", "window (active or inactive)", "window (create or destroy)", "menu selection", and any DDE message. This is because these queue entries do not effect the appearance of the web pages displayed by the browser.

As the operating system 195 processes the queue entries 171, "non DDE" messages are hooked 191 to the message 155. Upon determining 154 that the message redirector 155 has an interest in the message, control is passed to the message redirector 155. If the message redirector recognizes the message type 166 of the message redirector changes the message type 166 back by removing the tag, e.g., by subtracting the offset from the message type 166. The message redirector 155 also changes the destination 168 of the message to that of the browser 130, replaces the message in the queue, and returns control to the operating system 195. These messages, even though they originated at a remote source sharing client 150A are processed by the browser 130 to maintain the web pages of the sharing clients 150A,B the same.

However, if the queue entry 171 is message that originated at the source sharing client 150A, the message redirector duplicated the message 165AOut and sends it through the web sharing manager 160 and the network interface 120 over the network 115 to the receiving sharing clients 150B. Control is then returned to the operating system 195 which processes the message within the source sharing client 150A.

The Web Sharing Manager 160 provides the functionality to send both the CCI events 132AOut and messages 165AOut through the TCP/IP network interface 120 to the receiving sharing client(s) 150B. Also, the Web Sharing Manager 160 creates a proper header for receiving packets, through the network 115, from source sharing clients 150A. See FIG. 6 below.

The CCI events 132AIn and messages 165AIn sent to the sharing receiving client 150B inform the web sharing manager(s) 160B of the sharing receiving client 150B what the source sharing client 150A is doing. The web sharing manager 160B receives the sent CCI events 132AIn and messages 165AIn, strips the Web Sharing Manager header 620 of FIG. 6, and determines 161 that they are CCI events or messages in order to route them to the CCI redirector 145 or message redirector 155, respectively. The operating system 195, message redirector 155, and CCI redirector 145 then operate together, as defined above, to permit the real time sharing or collaboration, i.e., all sharing clients 150A,B are viewing and controlling their respective web page the same way. Also the same information e.g. data messages, etc. is viewed on the GUI displays (web pages) of all the sharing clients.

By using this invention, all sharing clients 150A,B collaborate to share the same web page, i.e. both users will see the same Web document displayed by their respective Web browser 130. If a sending user 150A, for example, inputs some keystrokes from the keyboard, creating message events 165A, the same keystrokes will be displayed on the receiving user 150B screen in the same way as if these keystrokes are input by the receiving user 150B. This sharing function of input is realized by the message redirector 155 which captures the input messages (e.g., keyboard, mouse messages) in the message queue 165 in the source client 150A and redirects the same messages as message events 165A to be replayed in receiving sharing clients 150B.

All the processes performed on the clients 150 are transparent to the Web server(s) 110. The web server only handles communication packets (see FIG. 6 below) with standard communication headers 610 that contains the sharing requests and information. All other functions of the server are the same as any typical WWW function. In a typical environment, the Web document(s) displayed by the Web browser 130 is (are) retrieved from the Web server(s) 110. With the hyperlink capability, this Web document may be linked to other Web documents in the same Web server 110 or in other Web servers 110 in the network 115. The Web server 110 is used as the repository of Web documents browsed by the Web browser 130.

Therefore, the CCI 132 with the CCI redirector 145 (and the message redirector 155) monitor CCI events 132A (messages 165A) independent of the use of these CCI events 132A (messages 165A) by the system 150A, so that they can be transparently passed over the network 115 to other sharing receiving clients 150B collaborating with the source sharing system(s) 150A.

Figure 2:
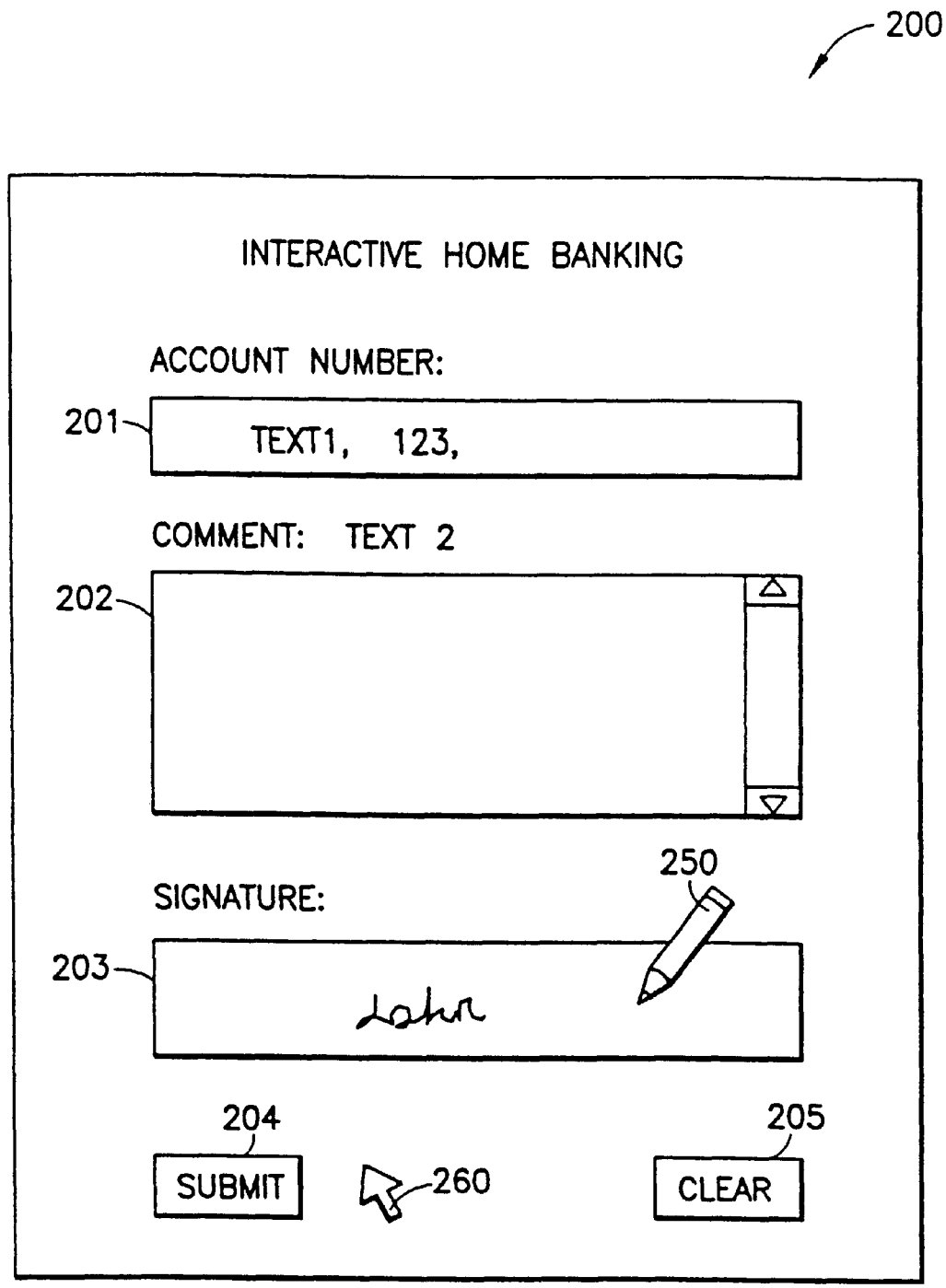
FIG. 2 shows a sample of a Web document (web page) that can be used by the present invention.

FIG. 2 shows a non limiting example of a Web document 200, displayed on the GUI 135 of the Web browser 130, which includes, for instance, a parent window 200 and one or more child windows (201–205). Here the child windows include: one text entry 201 object (e.g. for entering an account number), one multiple-line entry object 202 (e.g., for comment), two push-button objects (e.g. for submitting 204 and cleaning 205 the document), and a novel white area 203 (e.g. for a pen based or pointer based signature.) The Web document 200 is shown in the browser's window and other objects are created as the child window (201–205) of this window. By known techniques, the browser window is created when the browser starts and it persist until the browser is ended. The child windows (201–205) are created at the time the browser displays the Web document and they will be destroyed when the browser displays a new document, i.e. the child windows (201–205) in the document 200 are dynamically created and destroyed. Also in FIG. 2, the pen 250 and the pointer 260 represent the functionality of the Annotation 142 and the Remote Pointer 144, respectively. When the window of Web document 200 and its child windows (201–205) are created or destroyed, "window (create or destroy)" messages are generated by the operating system 195. But, these messages need not be processed or duplicated by the message redirector 155 since the same messages will be produced in other sharing receiving clients 150B by the operating system 195 of those 150B client(s). This occurs in two instances: 1) moving on to another page and 2) explicitly closing the page. When moving on, the sharing client must create a new page and therefore closes the current page. When explicitly closing a page, the CCI event closing the page is shared with the client 150B and will cause the client's operating system 195B to close the current page.

FIG. 3 shows the hierarchy of windows 300 (parent-child relationship) for the Web sample document of FIG. 2 embodied in a data structure. In a window system (e.g., Windows 3.1 or OS/2), each window, including the browser window, is identified by a number called a window handle which is unique and is only valid in the window system that creates it. This window handle, or "handle" is used to send/receive messages to/from other windows. The handle for the Netscape browser's window 310 is, let's say, 2000. The browser window handle 2000 is static and is not changed until Netscape browser is finished running. But, the handles 2021, 2022, 2023, 2024 and 2025 of the respective child windows 321, 322, 323, 324 and 325 will be dynamically created. These child handles (2021–2025) are valid only when the child windows are valid and will not be reused after these child windows are destroyed, e.g., when the browser jumps to a new document. These window handles (2021–2025) are used by this Web sharing system 100 to display the same document and to support the same input from various input devices (e.g. keyboard, mouse, pen) over two or more clients 150.

Figure 4:
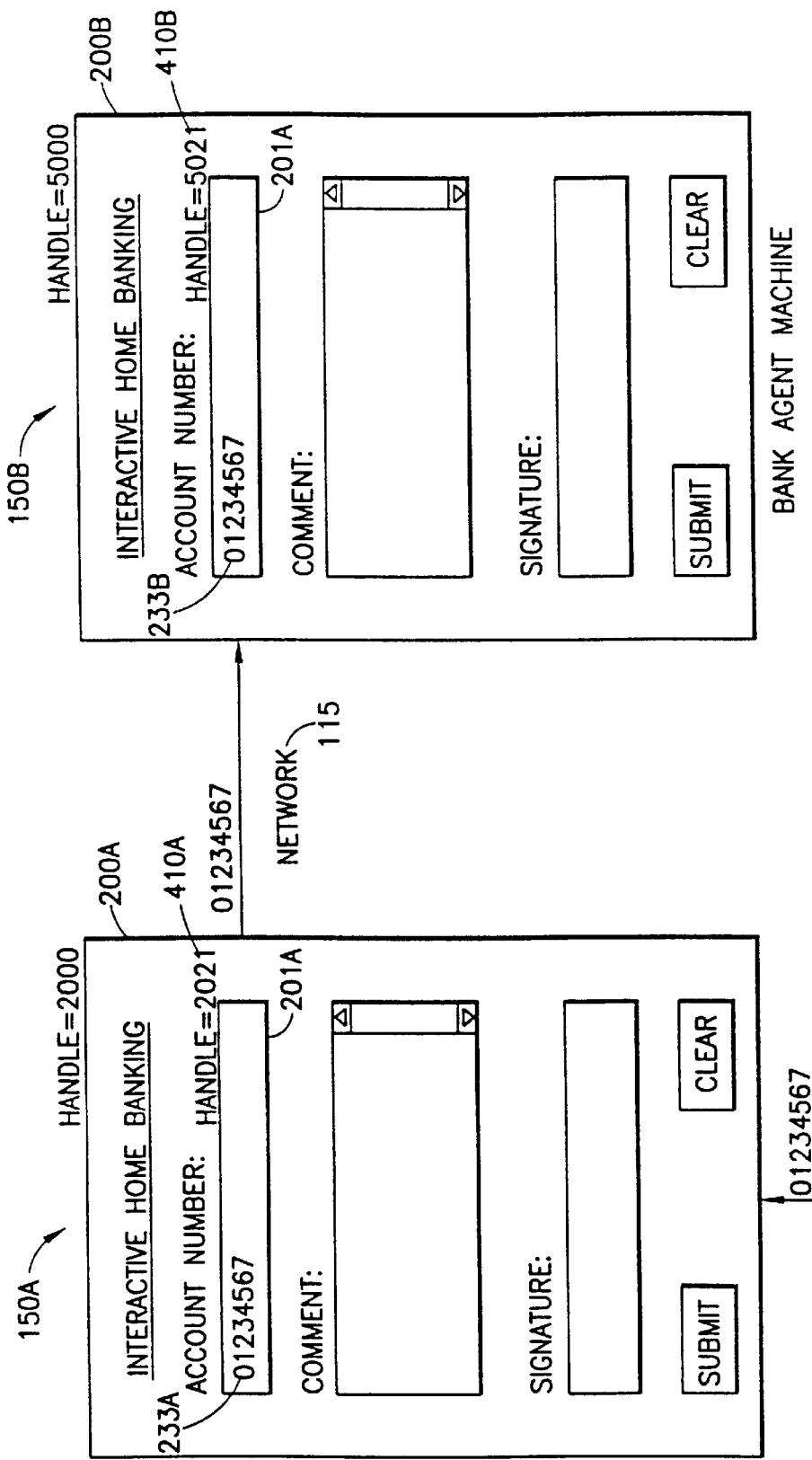
FIG. 4 shows an example of a shared Web document and the use of mapping.

FIG. 4 shows an example of sharing a Web document 200, let's say http://www.bank.com/homepage/htm, between a customer (here, for example, the source 150A) and a bank agent (here, for example, the receiver 150B).

There a two types of information to be shared between the customer and the bank agent: the view of the Web document 200 and the input data (e.g. keyboard input for the account number) 233. As a further example, the sharing of the view of Web document 200 is realized by the CCI redirector 145 as a CCI event 132A, whereas the sharing of input data 233 are realized by the message redirector 155 as a message event 165A. The detail mechanism used by the CCI redirector 145 and the message redirector 155 to support sharing of Web document will be described later.

More detail is now given about the mechanism used by the Web sharing system 100 to share the same Web document between source 150A and receiving 150B machines.

At the source 150A machine, when the customer opens a new URL, the Web document 200(A) is shown in the browser's 130A window having, for example, 2000 as the window handle. After the Web page is displayed, the browser 130A sends a CCI OpenURL event using the DDE protocol to CCI Redirector 145A to notify that the Web page is successfully opened and displayed. The CCI Redirector 145A redirects this OpenURL event 132A to the Web sharing manager 160A to process this event 132A. After receiving this OpenURL event, the Web sharing manager 160 enumerates the hierarchy of windows (as shown in FIG.

3) of the open document, assigns an ordering number to each window, and builds a table, for example, as shown in FIG. 5A for the customer machine 150A. For example, in FIG. 5A, the document 200A of FIG. 4 shown in the customer machine 150A has a window handle of 2000 and an ordering number 0. The child window 201A for document 200A for the account number 233A has a window handle 2021 (410A) and an ordering number 1. The window handles are created by the window system and are destroyed each time the associated windows are closed. Therefore, the window handles cannot be used to identify the child windows in the open Web page since the same Web page may be reloaded (closed and re-opened) by the browser. Instead of using the window handles, the Web sharing manager 160A uses the ordering numbers to identify the Web document's window and its child windows. For example, the ordering number 0 is used to identify the Web doument's window 200A, the order number 1 is for the the child window 201A for account number 233A.

At the bank agent (receiving) machine 150B, the Web sharing manager 160B receives the OpenURL CCI event 132A (from the Web sharing manager 160A) through the network 115 and passes this OpenURL CCI event 132A through the CCI redirector 145B to the Web browser 130B for opening a new URL. After receiving this request, the Web browser 130B opens and displays the Web document in its window having, let say, 5000 window handle. Similar to the creation of FIG. 5A in the customer machine 150A, the Web sharing manager 160B enumerates the hierarchy of windows (as shown in FIG. 3) of the open document 200B, assigns an ordering number to each window, and builds a table, for example, as shown in FIG. 5B for the customer machine 150B.

The mapping table data structure 500 is used by the web sharing manager 160 to map the window of the Web browser and its child windows on one client 150A to their corresponding windows on receiving clients 150B.

This mapping table 500 has records, typically 510, each having three or more fields. The first field 520 contains an ordering number of a window, a second field 530 contains the window handle of the respective window, and a third field 540 contains a type of the respective child window (321–325) (e.g. text, bit map, etc.) in the document 200. For instance, this table 500 is used to map a child window 203A in one machine (e.g. 150A) to the corresponding child window 203B in another machine 150B.

Since the browsing of Web document 200 and the processing of input data from the input device 190 are based on the information of the windows, the mapping table, as shown in FIG. 5, will allow the Web sharing system 100 to display the same Web document in the correct window of the Web browser 130 and to redirect the same input data to the right Web document.

For example, by using the table 500, all keyboard messages 165A sent to the window handle 2021 in the customer machine 150A are mapped to the messages 165B sent to window number 3 (in the ordering number field 520 of table 500) of the second machine 150B. This window number 3 will be known to have the window handle 5010 in the second machine 150B, e.g. the bank agent machine. Using this mapping mechanism 500, the keyboard input 190 to the text entry window 203A will be sent to the corresponding text entry window 203B, and the customer and the agent will see the same account number displayed on their screen. Other window types are mapped in the same way.

This capability will enable all clients 150 to see or share the same Web document shown on their screen by the Web browser 130 and the same input data from input devices 190 into the shared Web document. When a user clicks on the hyperlink to browse a new Web document, other users will automatically follow the hyperlink to the same Web document.

In addition to the sharing of Web document and input data, for example to imitate a face-to-face meeting, one user may use the remote pointer 144 to point to or to move around the objects in the shared document and other users engaged in the Web collaboration session will see the cursor of the remote pointer 144 displayed at and moved around the objects in discussion (since the movement of the remote pointer 144 will generate the mouse input data which are shared as described above). With the annotation 142, a user may use the pen input device, if it is available, or the mouse to write some comments or to highlight some areas on the shared document. The annotated comments or the highlights will simultaneous appear on other clients (since the annotation 142 will generate the pen/mouse input data which are shared as described above). This sharing of Web document and input devices will allow users to have a conference or meeting over the conference or meeting created by the Web sharing system 100 has the same atmosphere as face-to-face meeting.

FIG. 6 is a block diagram of communication packet 600 with a (e.g. TCP/IP) communication protocol used by the web sharing manager 160 to exchange requests and information between the client machines 150. The packet 600 has a communication header 610, two or more Web Sharing Manager headers 620, and a data section 630 with one or more fields. The first header 610, the communication header, is defined by TCP/IP protocols. This header 610 is well known. Since the Web Sharing Manager provides common functions to send and receive data for other components (CCI redirector, message redirector, etc.), it uses a novel web sharing manager header 620 to identify the receiver (e.g., annotation, remote pointer 144, CCI redirector 145, message redirector 155, web sharing manager 160) of the packet 600. This receiver information is contained in a receiver ID field 622 of the header 620. The web sharing manager header 620 further comprises a packet length 624 field that contains the size (e.g., the length) of the packet, i.e., the portion comprising the web sharing manager header 620 and the web sharing manager data 630. Other information can be included in the web sharing manager header 620.

The Web sharing data 630 section of the packet 600 is the packet data to be sent or received over the network 115 to the "receiver" named in the Receiver ID field 622. The web sharing manager strips the web sharing manager header 620 before this packet data 630 is passed to receiver. For example, the packet data 630 for CCI redirector 145 will include the type 632 of CCI event (e.g., Open URL event) and the parameter 634 of the CCI event (e.g., http://www.ibm.com/home.htm URL). Examples of packet data 630 for the receivers message redirector 155, remote pointer 144, annotation (e.g. pen based input) 144, will include the message types 632: keystroke from the keyboard 190, mouse 190, pen stroke 190, respectively. The parameters 634 would be keycode, mouse position, pen position, respectively.

When the Web document 200 displayed by the Web browser 130 is shared, the view of the Web document 200 in the Web browser's window as well as the input data (e.g. keyboard/mouse/pen input data) are shared between the source and receiving machines 150. The sharing of the view of Web document is realized by the CCI redirector 145 by communicating CCI events 132A whereas the sharing of input data is realized by the Message redirector 155 by communicating message events 165A.

The CCI redirector 145 uses the CCI events (e.g. OpenURL, WindowChange) provided in the Web Browser 130 in a novel way to implement sharing of the view of the web document 200 as described below.

When user 150A opens a new HTML document or browses the documents through hyperlink, the Web browser 130A at the source machine (e.g. 150A) notifies the CCI redirector 145A at the source machine 150A of CCI events 132A to be sent by the source machine 150A. Also, the CCI redirector 145B at the receiving machine 150B will pass the CCI events 132A at the receiving machine 150B to its respective Web browser 130B for execution in the same way as if these CCI events 132A were generated (as CCI events 132B) from the operations of user 150B. An example of a received CCI event is a request to display a Web document 200 that the sending user 150A opens.

Figure 7:
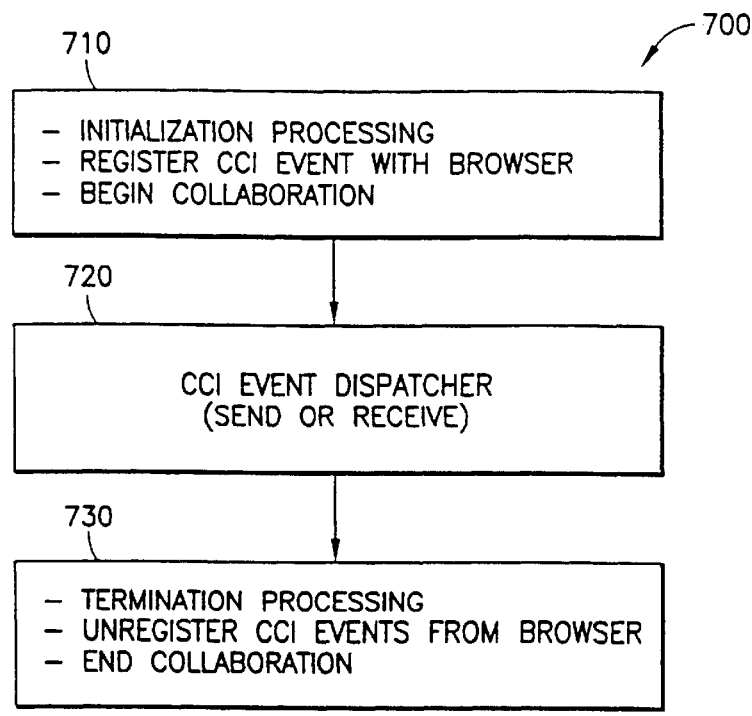
FIG. 7 is a flow chart showing the steps of registering, processing, and unregistering an event (e.g. CCI event) during a web sharing collaboration.

FIG. 7 is a flowchart of a process 700, executing on both the sending 150A and receiving 150B machines, showing the steps of initialization, processing a CCI event 132, and a termination done by CCI redirector 145 during the Web collaboration session. At the beginning of the Web collaboration, the CCI redirector 145 registers with the Web browser 130 all the CCI events 132 for which the CCI redirector 145 has interest. By this registration relationship, step 710, the Web browser 130 will notify the CCI redirector 145 by sending registered CCI events 132 using DDE protocol 131. Examples of CCI events that the CCI redirector 145 registers include: RegisterProtocol, RegisterWindowChange, etc. The redirector 145 is interested in any CCI event 132A that is need to create a document view on the receiving machine 150B.

For example, when a user 150A opens a new URL document, a CCI event 132 called Open URL, which is registered with the browser 130A in step 710 by CCI redirector 145A, is generated by the Web browser 130A and is sent to the CCI redirector 145A using the DDE protocol. By receiving this OpenURL CCI event, the CCI redirector 145A knows that a new Web document 200 is displayed by the Web browser 130A. By sending the name of the open Web document from the CCI redirector 145A (a sender of CCI event) to the corresponding CCI redirector 145B (a receiver of CCI event) through the respective Web sharing managers 160, the same Web document 200 can be displayed on the receiving machine 150B by sending OpenURL event from the CCI redirector 145B to the Web browser 130B using the DDE protocol 131B.

In step 720, CCI event 132A(B) is processed by CCI redirector 145B(A) as a sender (or a receiver) of CCI event 132A(B). The machine 150A is a sender when the browser 130A sends a CCI event 132A to the CCI redirector 145A and the machine 150A is a receiver when when the web sharing manager 160A passes the communication packet 600 to the CCI redirector 145A. This step 720 is shown in more detail for a CCI sender 145A in FIG. 8 and for a CCI receiver 145B in FIG. 9. When the Web collaboration is terminated, the CCI redirector 145, in step 730, will unregistered all registered CCI events 132 from the Web browser 130.

Figure 8:
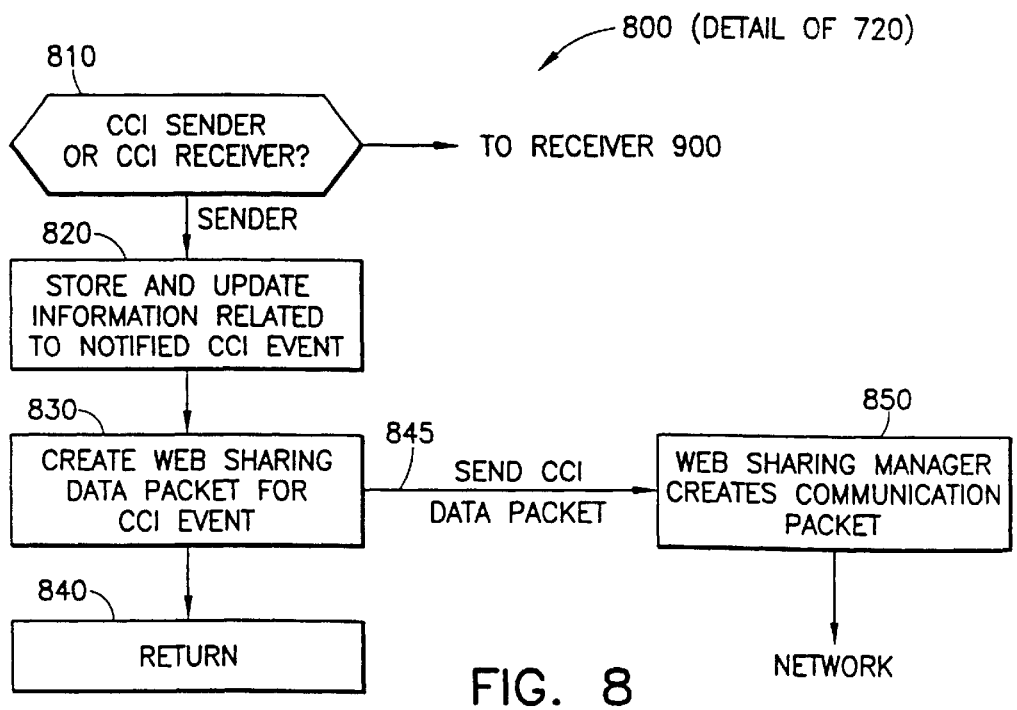
FIG. 8 is a flow chart showing the steps of creating and sending a packet with an (CCI) event by a source machine.

FIG. 8 is a flowchart of the steps 720 implemented on the source or sending client 150A that is notified of a CCI event from the Web browser 130. The CCI redirector 145A first determined 810 that the machine 150 is the source/sender 150A of a request from its web browser 130A. When the source web browser 130A notified the CCI redirector 145A of a CCI event 132A, step 810, the CCI redirector 145A stores and updates 820 the information (see FIG. 5A) related to this CCI event 132A for later use. To create the same state of the Web browser(s) on the receiving client(s) 150B, the Web Sharing Manager 160B disassembles the Communication Packet 600. The source CCI redirector 145A enters the type 632 and parameter 634 of the CCI event 132A into the network web sharing data packet 630. The CCI redirector 145A sends 845 the data packet 630 to its source Web Sharing Manager 160A. The source Web Sharing Manager 160A that creates 850 the entire communications packet 600 by entering the receiver ID 622 and packet length 624 in the Web Sharing Manager header 620 and providing any other communication header 610 information required. Note that the Web Sharing Manager 160 can send packets 600 to more than one client to create a multiple user session by providing a receiver ID 622 and any communication header (TCP/IP) 610 information required for each respective client receiver 150B. The packet is then sent through the interface 120 by the Web Sharing Manager 160A using known techniques, e.g. TCP/IP. Step 840 terminates the CCI process 720 for the source machine 150A for any given CCI event 132A.

Figure 9:
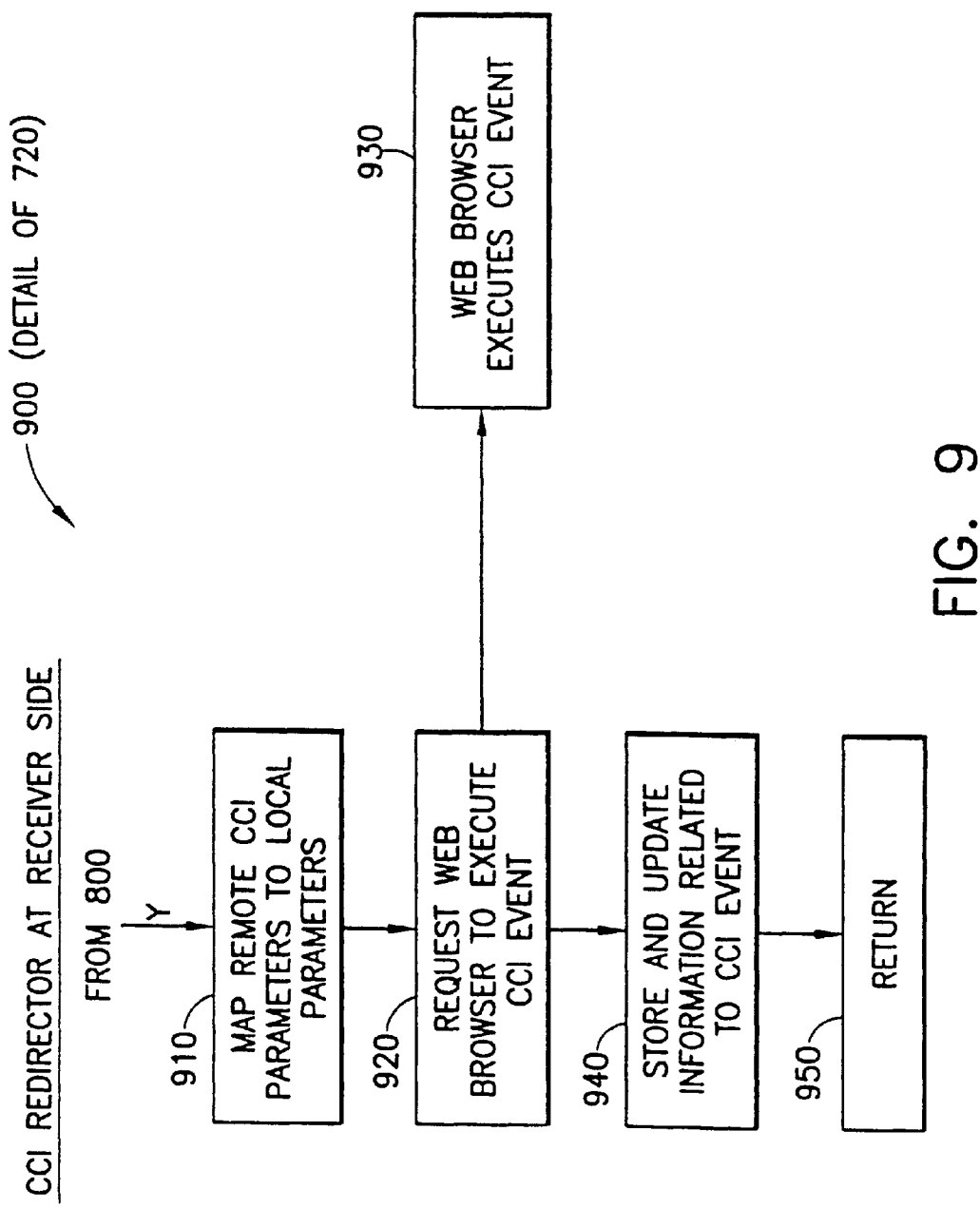
FIG. 9 is a flow chart showing the steps of receiving a packet with an (CCI) event at a receiving machine.

FIG. 9 is a flowchart of the steps 720 implemented on the receiving client 150B that receives a CCI event 132A from the Web Sharing Manager 160B. The Web Sharing Manager 160B disassembles the Communication Packet 600. The CCI Redirector 145B first determines that the machine 150 is the receiver 150B of a Web sharing data packet from the Receiver ID 622 that was disassembled by the Web Sharing Manager 160B. (Note that the receiver ID 622 can be the CCI redirector 145B or he Message redirector 155B.) After determining the type 632 and parameter 634 of the received CCI event 132A, the CCI redirector 145B converts 910 CCI parameters to the local ones, using the DDE protocol 131B. This is done by creating and providing the information in table 550. (Note that the DDE protocol of the sender 131A usually is the same as that of the receiver 131B. However, one the CCI event 132A is recreated at the receiver, it then can be converted by the CCI redirector 145B into a new format, e.g. Netscape to Mosaic.)

As an example, in step 910, when machine 150B receives an OpenURL CCI event 132A, the CCI redirector 145B passes the OpenURL CCI event to the browser 130B (the request to execute the event in step 920) which will access the document to be opened from the server specified in the parameter 634. Then, as the browser 130B builds the document view, the CCI redirector 145B determines how many child windows there are and completes the information require in table 550. (Note that when the browser 130B initiated, the parent window was already created in table 550).

In step 930, the browser 130B executes the CCI event requested by the CCI redirector 145B. The local Web browser 130B has the same state 930, i.e. executes the same CCI Event 132A, as the remote Web browser 130A, but uses the mapping of the local system 150B to create the identical document in view in both places. The result of the execution 930 of CCI event 132A is returned from the Web browser 130B to the CCI redirector 145B and may be stored and updated 940, if appropriate, by the CCI redirector 145B for later use in the table 550.

Step 950 returns control to step 720 which continues to call process 800 until it terminates in step 730.

Messages and/or data are handled as Message Events 165A in a similar fashion as controls, i.e., CCI events 132.

Figure 10:
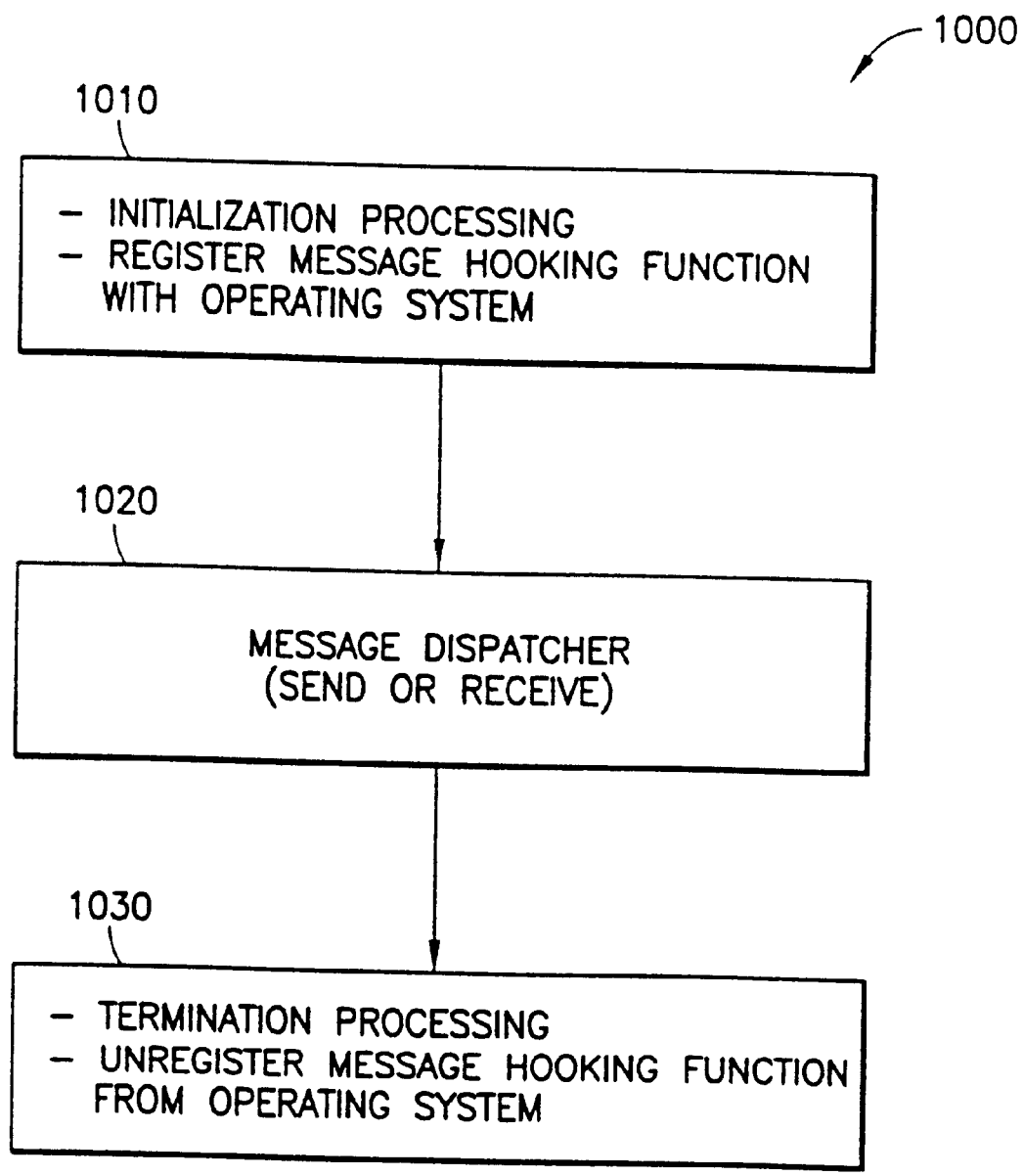
FIG. 10 is a flow chart showing the steps of registering a message queue hooking, processing an input message, and unregistering a message queue hooking during a web sharing collaboration.

FIG. 10 is a flowchart of a process 1000, executed by both the sending 150A and receiving 150B machines, showing the steps of initialization, processing input messages, and termination done by Message redirector 155 (sender or receiver) during the Web collaboration session.

In a message-driven window system (for example, Windows 3.1 or OS/2) an application obtains data (parameter 634) from input devices 190 (mouse, keyboard, pen, etc.) in the form of messages (mouse, message, keyboard message, pen message, etc.) that the operating system 195 sends to the application through its message queue 165.

The Message redirector 155 is used to implement the sharing of data from input devices 190 among clients 150. When a user 150A inputs some data into the Web document, these input data are transformed by the operating system 195 into messages which are kept in the message queue 165A. The Message redirector 155A (a source or sender) captures or hooks 191 these input data by intercepting the messages sent to the Web browser's objects (e.g., button object, text entry object, list box object) through the message queue 165.

To have the same input to the Web document at other clients 150B, the Message redirector 155A (a source or sender) sends the intercepted messages to its corresponding Message redirector 155B (a receiver) through the Web Sharing Manager 160B. Then, the receiver Message redirector 155B puts these messages into the message queue 165, on system 150B, in the same way as if these message are generated by the operating system 195B for the local input devices 190B.

At the beginning of the Web collaboration, the Message redirector 155 uses a known failure provided by the operating system 195 to hook (1010, 191) the message queue 165.

For example, if the user 150A types his/her name into the text entry object for name input in a Web document, the message redirector 155A intercepts this keyboard messages and sends to the corresponding message redirector 155B at other clients 150B. At each remote client 150B, the sent keyboard messages are put into the message queue 165, on machine 150B, and are retrieved by the text entry object for name input in the similar way as if these key strokes are locally input by the user 150B. As the result, all users will see the same name in their Web document.

As another example, when machine 150B receives an message event 165A, the message redirector 155B maps the window ordering number 520A,B to the window handle 530B so that the parameter 634 is placed (step 920) in the message event queue 165B associated with the mapped window handle 530B.

In step 1020, the input message is processed by message redirector 155 as a sender (when the operating system 195 recognizes that the browser retrieved a Message Event 165A from the message queue) or a receiver (when the Web Sharing Manager 160A passes the Communication Packet 600 to the message redirector 155) of input message. This step 1020 is elaborated for a message sender in FIG. 11 and for a message receiver in FIG. 12. When the Web collaboration is terminated, the message redirector 155, in step 1030, uses a known feature of the operating system to unregister message queue hooking.

In step 1030, the message redirector 155 terminates the processing by unregistering the hooking of the message event queue 165, i.e., if the browser 130 receives a message from the queue 165 the message redirector 155 will not be called and process 1000 will not execute.

Figure 11:
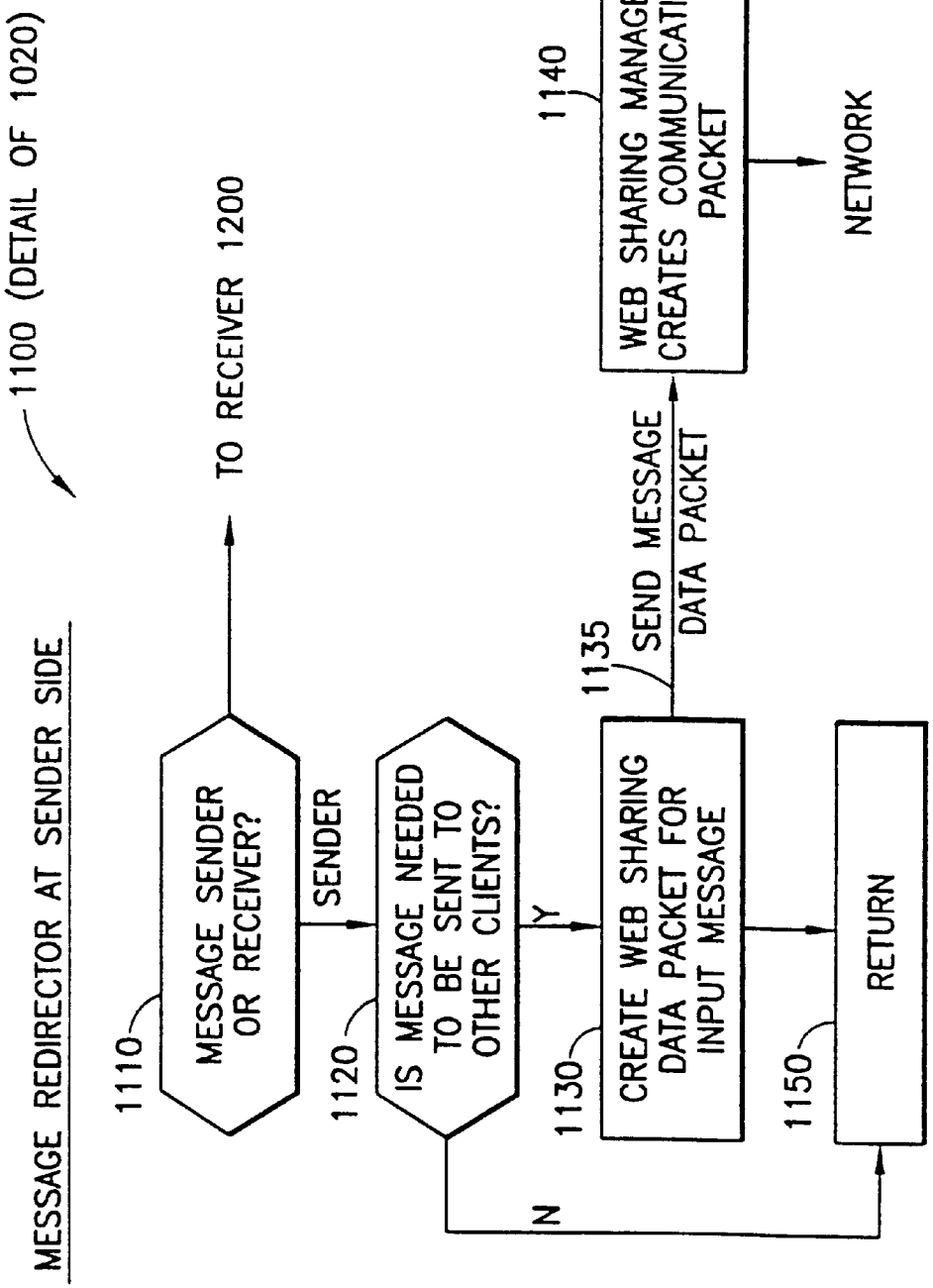
FIG. 11 is a flow chart showing the steps creating and sending a packet with an input message by a source machine.

FIG. 11 is a flowchart of the steps 1020 implemented on the source or sending client 150A that intercepts the input message from the message queue 165, at a sending machine 150A. The message redirector 155A first determines 1110 that the machine 150 is the source/sender 150A of an input message intercepted from the message queue 165A. Based on the type 166 of the message, each message is checked to determined whether or not it is necessary to send the intercepted message to other clients 150B (step 1120). This step 1120 for processing each message is elaborated in FIG. 14. If the message is needed to be sent to other clients 150B, the source message redirector 155A enters 1130 the type 632 and parameter 634 of the input message into the network web sharing data packet 630. (In general the type 632 is the message type 166 and the parameter 634 are the fields 167, 168, and 169 in the queue entry 171.) The message redirector 155A sends 1135 the data packet 630 to its source Web Sharing Manager 160A. The source Web Sharing Manager 160A then creates 1140 the entire communications packet 600 by entering the receiver ID 622 and packet length 624 in the Web Sharing Manager header 620 and providing any other communication header 610 information required. The packet is then sent through the interface 120 by the Web Sharing Manager 160A using known techniques, e.g. TCP/IP. Step 1150 terminates the message process 1020 for the source machine 150A for any given input message from the message queue 165 and returns control to step 1020.

Figure 14:
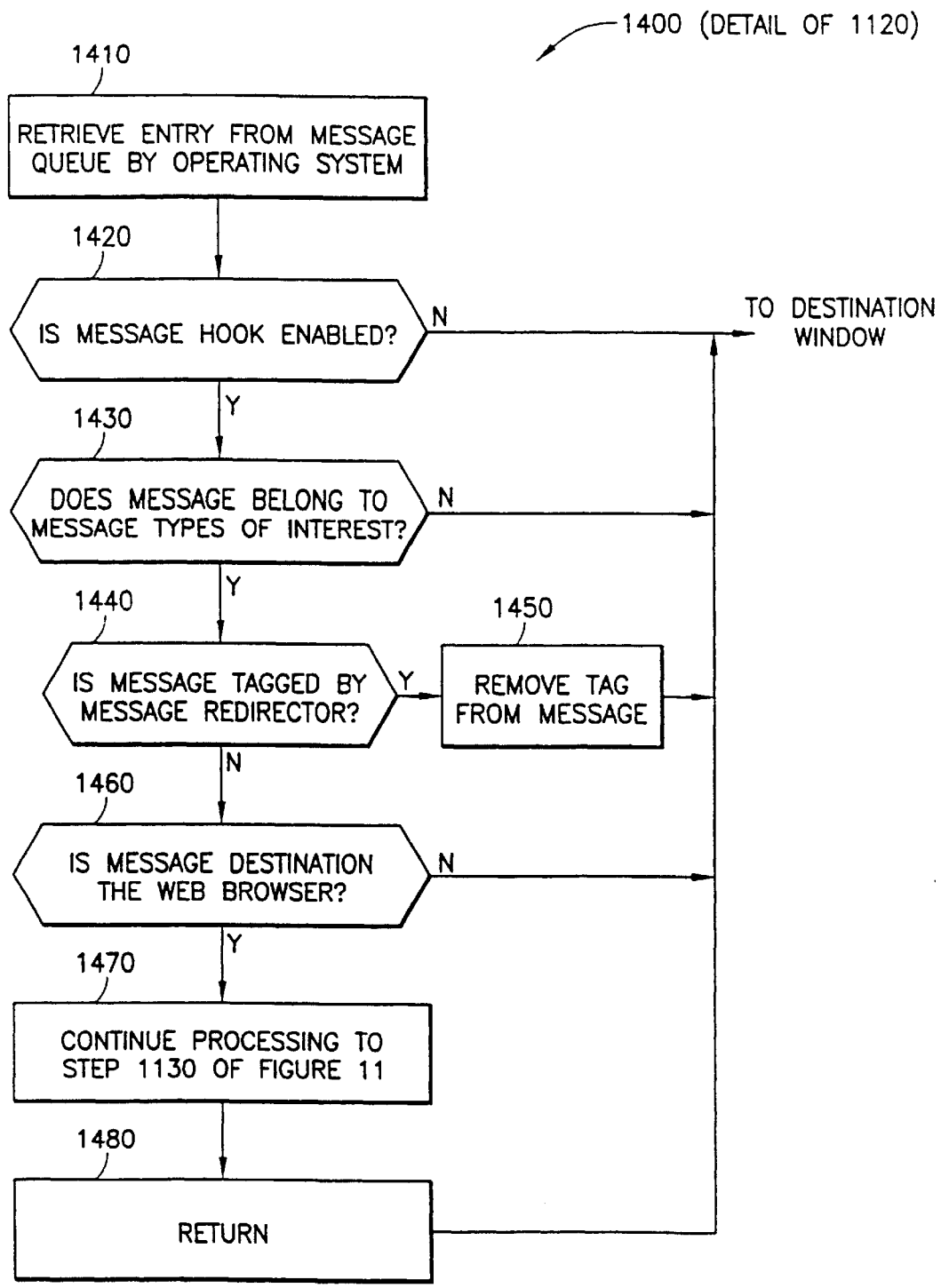
FIG. 14 is a flow chart of process steps performed by a message redirector process.

FIG. 14 is a flowchart of the step 1120 performed by the message redirector 155. The operating system 195 retrieves an entry 171 from the message queue 165 (step 1410) and it checks if the hook 191 is enabled (step 1420). If the hook is disabled, the entry will be delivered the the destination 193. Since the message redirector 155 has hooked 191 the queue 165, the message director will receive all entries 171 and it examines if the message type is of interest as described above (for example, key code, mouse button click or double click, mouse move, scrolling message, tagged messages). If the message type 166 is a tagged message (step 1440) indicating that the message came from a source client 150A, the message redirector changes the message type 166 back by removing the tag (step 1450) and this entry 171 is passed to the destination 193. The message redirector 155 only duplicates the messages destined to the Web browser by examining the destination field 168 (step 1460). If the destination field 168 is the Web browser window or its child windows, the processing is continued 1470 to step 1130 of FIG. 11.

Figure 12:
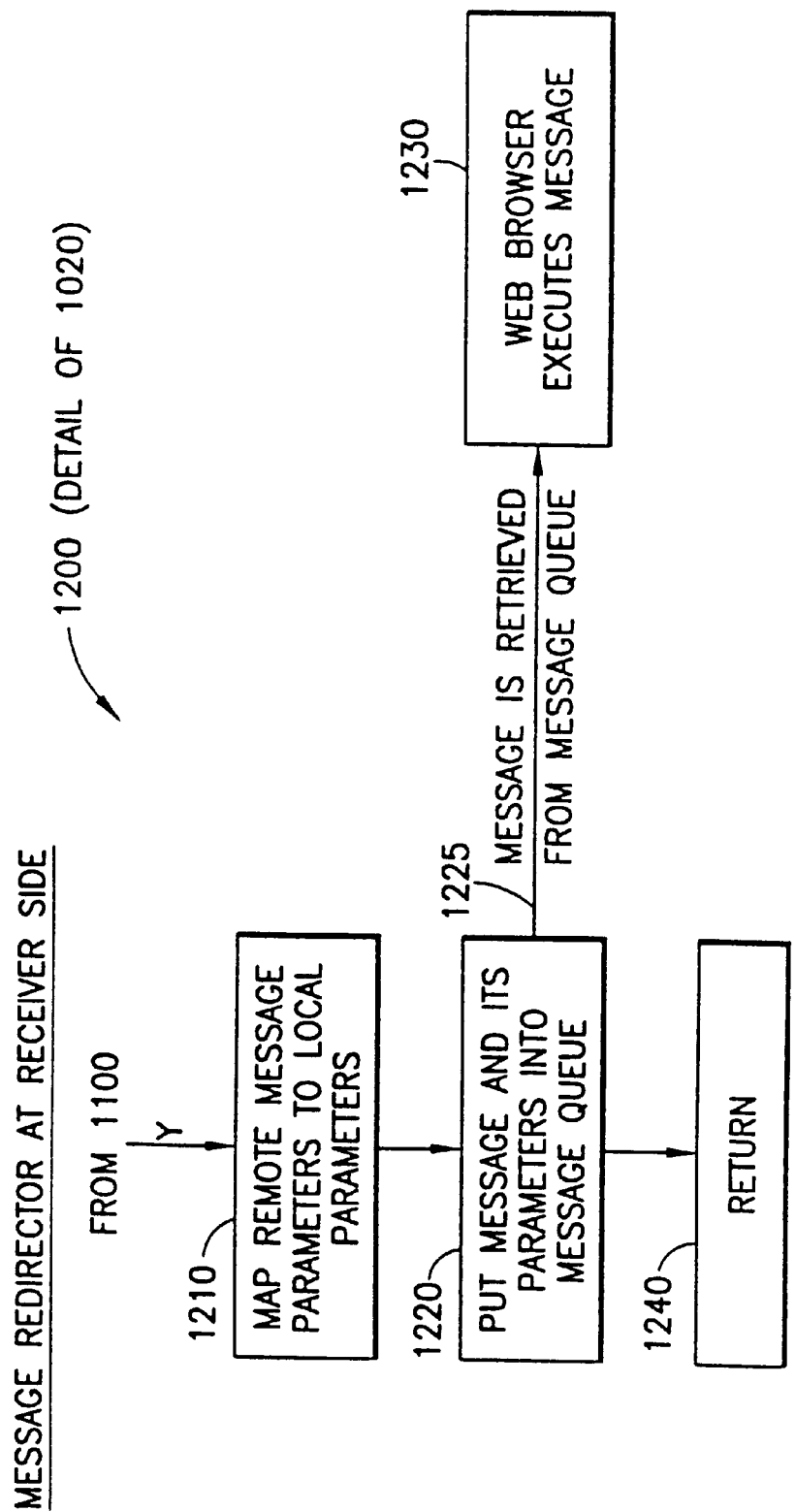
FIG. 12 is a flow chart showing the steps of receiving a packet with a input message at a receiving machine.

FIG. 12 is a flowchart of the step 1020 implemented on the client 150B that receives an input message from the Web Sharing Manager 160B. The message redirector 155B first determines that the machine 150 is the receiver 150B of a Web sharing data packet from the Web Sharing Manager 160B. The receiver message redirector 155B then retrieves the type 632 of the message and its parameters 634 from the data packet 630. (In general, the type 632 will be the message type 166 and the parameters 634 are the fields 167, 168, and 169 of the queue entry 171.) Since some parameters of the received message are only valid for the operating system where the message is intercepted, these parameters are converted to the local parameters of each client 150B by the message redirector 155B (step 1210). The message redirector 155B puts the received message together with its converted parameters (step 1220) into the message queue 165, at the receiving machine 150B. The Web browser 130B retrieves 1225 the message from the message queue 165B and processes 1230 it in the same way as if this input message is from the local input devices 190B. The sender Web browser 130A and the receiver Web browser 130B then get the same input message, i.e. source user 150A and receiver user 150B share the same input data. Step 1240 terminates the message process 1020 for the receiver machine 150B for any given data packet 630 from the Web Sharing Manager 160B and returns control to step step 1020.

Figure 13:
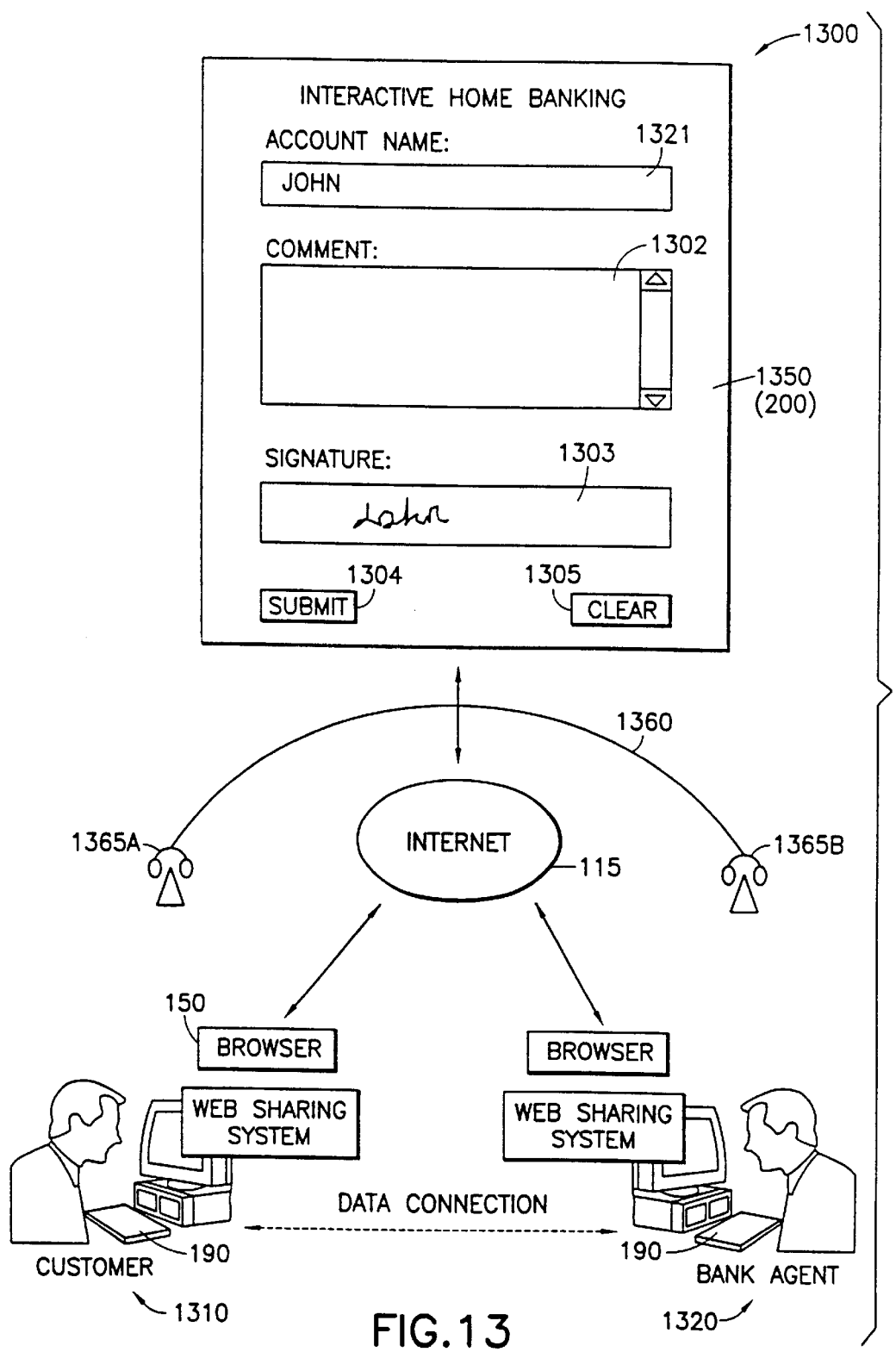
FIG. 13 is a diagram showing non limiting examples of various web page sharing collaborations between a customer (s) and an agent(s).

FIG. 13 is a drawing showing some preferred uses of the present system 100. In particular, an implementation 1300 of an interactive customer and agent collaboration, e.g. in a Home Banking system using the web page sharing system 100 is described.

In the following scenario, a customer would like to open a new account with a bank advertising on the Internet. By using Interactive Home Banking prototype 1300, the bank agent 1320 is able to collaborate and help the consumer 1310 to fill in the application form 1350, i.e., document 200, for a new account.

A customer uses a personal computer 150 to connect to the Internet 115 and runs a web browser (e.g. Netscape Navigator) 130 to browse the home page of a bank called "Interactive Home Bank." After reading the information on the products offered by the bank, the customer 1310 desires to open a new account with this bank, and therefore makes a data connection with the bank agent 1320 to establish a web collaboration session.

To facilitate the discussion, a voice connection 1365 may also be established through the telephone network 1360 or other mechanisms. The voice connection can be made through a standard direct dial telephone connection or can be made through the internet via techniques 1368 described in U.S. patent application Ser. No. 08/595,897 to Hortensius et al. entitled "Multipoint Simultaneous Voice and Data Services Using a Media Splitter Gateway Architecture" filed on Feb. 6, 1996, which is herein incorporated by reference in its entirety.

In the web collaboration session, when a new web document 1350 is open by one of the users (customer or bank agent), the same document will be displayed on the screen of another user. This sharing of browsing the web document 1350 is supported by the CCI redirector, as described above. For example, if the bank agent 1320 displays the application form 1350, the customer 1310 will see the same form of his/her screen. By using the functionality of the message redirector, the key strokes typed by the customer for the account name will also appear in the corresponding account name field on the bank customer's screen. (Here the account name 1321, comment 1302, signature 1303, submit 1304, and clear 1305, windows correspond to the child windows described in FIG. 2. In facilitate the discussion, the customer 1310 and the bank agent 1320 may use the Annotation 142 and Remote Pointer 144 to mark and point to the areas on the application form. With this prototype, the customer and the bank agent can collaborate together and share the web document and the input data to fill in a form for opening a new bank account.

Alternative embodiments are possible. For example, the document 1350 can be a contract, an order form, a menu, a design drawing, a listing of software code, a patent application, a bill of laden, or any other document 1350/200 generally used in commerce. The agent 1320 can be a sales person, a service provider (doctor, lawyer, accountant, etc.), designer (engineer, architect, programmer), manager, etc. The customer 1310 can be any person that would use the goods and/or services provided by the agent and/or person the would work with (or for) the agent 1320 using or producing the document 1350. There can be more than one agent 1320 and/or more than one customer 1310. For example, the agent 1320 can be a teacher that teaches more than one student (customer) 1310. The customers 1310 can be a plurality of people in a single or multiple companies "conferencing" with multiple supplier company personnel and/or consultant (agents) 1320. Pen based interfaces permit all the collaborating parties to simultaneously sign documents 200, e.g. contracts (like rental car agreements), credit card statements, using the internet without leaving their home or place of business.

Given this disclosure, other equivalent embodiments of this invention would become apparent to one skilled in the art. These embodiments are within the contemplation of the inventors.

We claim:

1. A client computer having one or more memories, one or more central processing units, one or more displays, one or more user input devices, an operating system, and a network interface with a network protocol for communicating to a network, the network connected to one or more servers and one or more shared client computers, the client computer further comprising:

a browser for requesting one or more pages from one or more of the servers by sending one or more browser requests though the network interface and over the network to the server and the browser receiving from the server one or more of the requested pages sent over the network through the network interface;

one or more redirectors capable of recreating one or more of the browser requests, being redirected browser requests, the redirected browser requests recreated from one or more of the browser requests necessary to create a web page on the display; and a web sharing manager connected to the one or more redirectors and to the network interface, receiving the redirected browser request, and sending the browser request over the network to one or more of the shared client computers.

2. A client computer having one or more memories, one or more central processing units, one or more displays, one or more user input devices, an operating system, and a network interface with a network protocol for communicating to a network, the network connected to one or more servers and one or more shared client computers, the client computer further comprising:

a browser capable of generating and processing one or more events;

an operating system for processing one or more messages;

a queue for stacking one or more queued entries, one or more of the queued entries each containing one of the messages, and one or more of the queued entries containing one of the events;

one or more redirectors capable of monitoring and recreating one or more of the queued entries, being directed queued entries; and a web sharing manager connected to the one or more redirectors and to the network interface and receiving the directed queued events from the redirector, the web sharing manager incorporating each of the directed queued events in a sent packet conforming to a network protocol, the web sharing manager further sending the sent packets through the network interface and over the network to one or more of the shared client computers.

3. A system, as in claim 1, where one or more of the messages include any one of the following: an operating system message, an application message, a input device message, and a message produced by one or more of the shared computers.

4. A system, as in claim 2, where one or more of the events is a browser request.

5. A system, as in claim 4, where the browser request is a request for one or more web pages from one or more of the servers.

6. A system, as in claim 5, where the server is an HTML server and one or more of the pages is an HTML page.

7. A system, as in claim 2, where the user input device includes any one or more of the following: a pen, an handwriting annotation driver, a pen overlay, a remote pointer, a mouse, a keyboard, a virtual reality input, and a speech recognition system.

8. A system, as in claim 2, where the network includes any one of the following: the internet, a local area network, and a wide area network.

9. A system, as in claim 2, where the network protocol is TCP/IP.

10. A system, as in claim 2, where one or more of the queued events are common client interface (CCI) events created by the browser.

11. A system, as in claim 10, where the CCI event is converted into an operating system protocol.

12. A system, as in claim 11, where the operating system protocol is Dynamic Data Exchange (DDE).

13. A system, as in claim 10, where the CCI event includes any one or more of the following: a request for opening a page, a request to change a window size, a request to register a protocol, a request to unregister a protocol, a request to get window information, a request to be notified when a new page is open, and a request to be notified when a window size is changed.

14. A system, as in claim 2, where one or more of the messages are created by one or more of the following: keystrokes from a keyboard, mouse clicks and movements, pen input, speech signals from a speech recognition system, and operating system messages.

15. A system, as in claim 2, where the sent and received packets have a communication header with information used by the network protocol and one or more Web Sharing Manager Headers, each Web Sharing Manager Header having a Receiver ID field and a Packet Length field, the Receiver ID field having a receiver value that identifies the redirector and the Packet Length field having the length value specifying the length of a Web Sharing Manager Data having a Data Type field that identifies the type of the event and a Parameter field that identified the parameters associated with the event.

16. A client computer having one or more memories, one or more central processing units, one or more displays, one or more user input devices, an operating system, and a network interface with a network protocol for communicating to a network, the network connected to one or more servers and one or more shared client computers, the client computer further comprising:

a browser for requesting one or more pages from one or more of the servers by sending one or more browser requests though the network interface and over the network to the server and the browser receiving from the server one or more of the requested pages sent over the network through the network interface, the browser displaying one or more of the pages on the display with one or more messages of information from the user input device;

one or more redirectors capable of recreating one or more of the browser requests, being redirected browser requests, the redirected browser requests recreated from one or more of the browser requests necessary to create a page on the display, the redirectors further capable of recreating one or more of the messages being redirected messages; and a web sharing manager connected to the one or more redirectors and to the network interface, receiving the redirected browser requests and redirected messages, and sending the browser requests and redirected messages over the network to one or more of the shared client computers so that the shared client computer displays a copy of the page on a shared display.

17. A computer, as in claim 16, where the computer is an agent computer used by an agent, the page is a document, and the shared computer is a client computer used by a client.

18. A computer, as in claim 17, where zero or more input devices on the client computer and zero or more input devices on the agent computer includes any one or more of the following: a pen, an handwriting annotation driver, a pen overlay, a remote pointer, a mouse, a keyboard, a virtual reality input, and a speech recognition system.

19. A computer, as in claim 17, where the input device is a pen capable of producing a signature and the document has one or more windows where the signature is placed.

20. A computer, as in claim 17, where the document is any document generally used in commerce.

21. A computer, as in claim 20, where the document can be any one or more of the following: a contract, a rental car agreement, a credit card statement, a bank statement, an application, a form, a tax form, an order form, a menu, a design drawing, a listing of software code, a patent application, and a bill of laden.

22. A computer, as in claim 17, where the agent can be any one or more of the following: a sales person, a service provider, a doctor, a lawyer, an accountant, a designer, a rental agent, an engineer, an architect, a banker, a stock broker, a programmer, a teacher, and an employee.

23. A computer, as in claim 17, where the client can be any one or more of the following: a customer, a student, and a manager.

24. A client computer having one or more memories, one or more central processing units, one or more displays, one or more user input devices, an operating system, and a network interface with a network protocol for communicating to a network, the network connected to one or more servers and one or more shared client computers, the client computer further comprising:

a browser means for requesting one or more pages from one or more of the servers by sending one or more browser requests through network interface and over the network to the server and the browser receiving from the server one or more of the requested pages sent over the network through the network interface, the browser displaying one or more of the pages on the display with one or more messages of information from the user input device;

one or more redirectors means for recreating one or more of the browser requests, being redirected browser requests, the redirected browser requests recreated from one or more of the browser requests necessary to create a web page on the display, the redirectors further capable of recreating one or more of the messages being redirected messages; and a web sharing manager means, connected to the one or more redirectors for connecting to the network interface, receiving the redirected browser requests and redirected messages, and sending the browser requests and redirected messages over the network to one or more of the shared client computers so that the shared client computer displays a copy of the page on a shared display.

* * * * *